United States Patent
Hawkins et al.

(10) Patent No.: US 11,994,227 B2
(45) Date of Patent: May 28, 2024

(54) REGULATOR WITH IMPROVED TURNDOWN

(71) Applicant: Emerson Process Management Regulator Technologies, Inc., McKinney, TX (US)

(72) Inventors: James Hawkins, Allen, TX (US); Tony A. Durant, McKinney, TX (US); Chun Lin, McKinney, TX (US)

(73) Assignee: Emerson Process Management Regulator Technologies, Inc., McKinney, TX (US)

( * ) Notice: Subject to any disclaimer, the term of this patent is extended or adjusted under 35 U.S.C. 154(b) by 40 days.

(21) Appl. No.: 17/501,289

(22) Filed: Oct. 14, 2021

(65) Prior Publication Data
US 2023/0120848 A1    Apr. 20, 2023

(51) Int. Cl.
*F16K 3/26* (2006.01)
*F16K 3/314* (2006.01)
*F16K 47/08* (2006.01)

(52) U.S. Cl.
CPC ............. *F16K 3/26* (2013.01); *F16K 3/314* (2013.01); *F16K 47/08* (2013.01)

(58) Field of Classification Search
CPC ....... F16K 3/26; F16K 3/314; F16K 47/08–16
USPC .......................................... 251/325; 137/270
See application file for complete search history.

(56) References Cited

U.S. PATENT DOCUMENTS

| | | | | |
|---|---|---|---|---|
| 319,678 A | * | 6/1885 | Crane | F16K 3/26 251/325 |
| 3,157,200 A | * | 11/1964 | Rowan | F16K 39/04 137/625.33 |
| 3,834,666 A | * | 9/1974 | Keith | F16K 1/34 137/625.38 |
| 4,249,574 A | * | 2/1981 | Schnall | F16K 47/08 137/625.37 |
| 4,705,071 A | * | 11/1987 | Connors, Jr. | F16K 47/08 376/463 |
| 5,014,746 A | * | 5/1991 | Heymann | F16K 47/08 137/625.3 |
| 6,637,452 B1 | * | 10/2003 | Alman | F16K 3/243 251/324 |
| 6,701,958 B2 | | 3/2004 | Baumann | |
| 6,807,985 B2 | | 10/2004 | Kabat et al. | |
| 9,151,407 B2 | | 10/2015 | Fontaine et al. | |
| 10,215,306 B2 | | 2/2019 | Bareuer | |
| 10,551,855 B2 | | 2/2020 | Hart et al. | |
| 2013/0025723 A1 | * | 1/2013 | Dutrop | F16K 47/08 251/118 |
| 2019/0353265 A1 | * | 11/2019 | Gabriel | F16K 27/00 |

* cited by examiner

*Primary Examiner* — John Bastianelli
(74) *Attorney, Agent, or Firm* — Quarles & Brady LLP

(57) ABSTRACT

A trim assembly for a regulator can include a cage and a plug assembly. The cage can include a peripheral wall defining an opening and a plurality of cage apertures formed in the peripheral wall. The plug assembly can include a plug and a sealing element and can be configured to be moveably received within the opening so that the sealing element contacts an inner surface of the cage to vary a flow area through the plurality of cage apertures depending on the position of the plug.

20 Claims, 15 Drawing Sheets

REGULATOR WITH IMPROVED TURNDOWN

BACKGROUND

Regulators can be used to regulate pressure and control flow for the distribution of a fluid. In particular, some regulators may be service regulators that can be configured to reduce the pressure of fluid (e.g., natural gas) from high-pressure main line and to control the flow rate of the fluid to meet downstream demand while maintaining downstream pressure within a desired range.

SUMMARY

Embodiments of the invention can provide an improved regulator, including a service regulator for the distribution of a fluid such as natural gas.

In some embodiments, a regulator may include a regulator body defining an inlet and an outlet, and a seat disposed within the regulator body. The seat may be disposed along a flow path between the inlet and the outlet. The regulator may further include a plug assembly and a cage. The plug assembly may be moveable relative to the seat to regulate flow along the flow path, and may include a plug and a peripheral sealing element. The cage may have a peripheral wall that may define a central opening so that the cage may surround the flow path adjacent to the seat and moveably receive the plug within the central opening. The peripheral wall may include a plurality of cage apertures that extend through the peripheral wall. The peripheral sealing element may seat against an inner surface of the peripheral wall, over a range of travel of the plug assembly, to define a flow area of the cage apertures that is included in the flow path. The flow area may change depending on the position of the plug assembly along the range of travel.

In some embodiments, a regulator may include a regulator body defining an inlet and an outlet and a seat disposed within the regulator body. The seat may be disposed along a flow path between the inlet and the outlet. The regulator may further include a plug and an annular cage. The plug may be moveable relative to the seat to regulate flow along the flow path, and the plug may define a circumferential groove that retains a peripheral sealing element. The annular cage may be disposed between the inlet portion and the outlet portion, and may define a central opening that moveably receives the plug so that the peripheral sealing element and a radially inner surface of the annular cage collectively define a flow characterization for flow along the flow path past the seat. The flow characterization may vary based on a current position of the plug relative to the seat.

In some embodiments, a trim assembly for a regulator may include a cage having a peripheral wall that may define an opening and a plurality of cage apertures formed in the peripheral wall. The trim assembly may further include a plug including a sealing element. The plug may be configured to be moveably received within the opening so that the sealing element contacts an inner surface of the cage to vary an effective flow area through the plurality of cage apertures of the cage based on the position of the plug.

BRIEF DESCRIPTION OF THE DRAWINGS

The accompanying drawings, which are incorporated in and form a part of this specification, illustrate embodiments of the invention and, together with the description, serve to explain the principles of embodiments of the invention.

DETAILED DESCRIPTION

Figure 1:
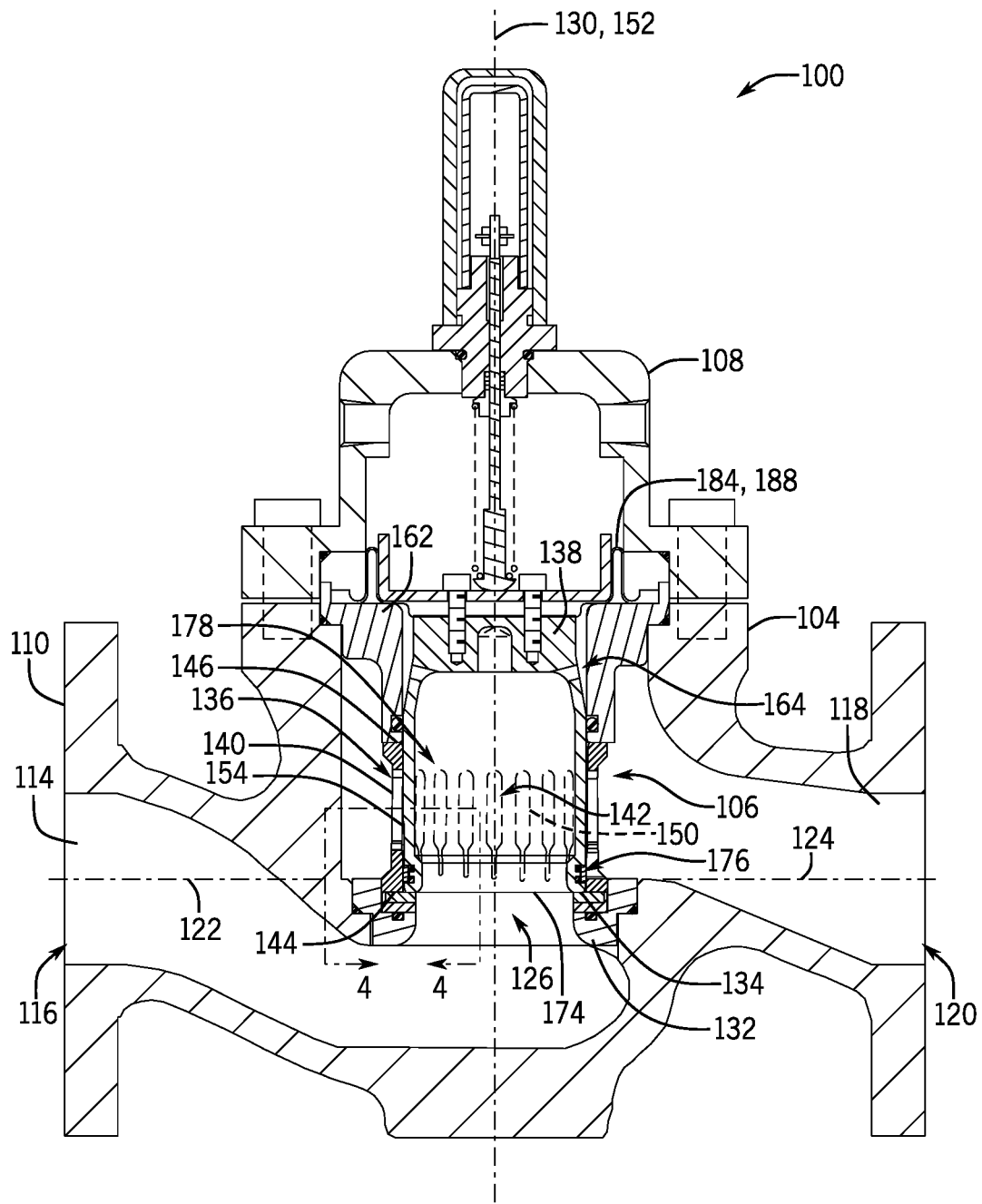
FIG. 1 is a cross-section view of a regulator including a trim assembly having a cage and a plug assembly in a fully closed configuration, according to some embodiments of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

As noted above, regulators can be used for the distribution of natural gas or other fluids. In some cases, regulators can be configured to reduce the pressure of the relevant fluid from a main line or distribution station, and to control the flow rate of the natural gas to meet downstream demand while maintaining downstream pressure within a desired range.

As development of urban or other areas expands, the demand for natural gas typically increases gradually over a long period of time, generally over the course of a few years or even decades. Thus, for natural gas infrastructure that is installed for a new development, demand may start out low but then increase significantly over time. To account for this change in demand, regulators can be sized for either the current demand (i.e., an initial demand), which can result in increased future costs and disruptions to service when the regulators must be upgraded, or regulators can be sized to deliver the amount of natural gas that will be needed once an area has been fully developed (i.e., can be sized to an expected final demand).

While sizing a regulator to meet final demand is generally preferred, conventional regulators may not have sufficient turndown characteristics (i.e., the ratio of the maximum capacity of the regulator to the minimum flow rate required) to provide stable flow in both low- and high-demand conditions. For example, while conventional regulators can be configured to provide high flow rates to meet final demand, the regulators may be unable to effectively operate at very low flow rates to effectively regulate the natural gas supply during initial demand. Put another way, some conventional regulators may be incapable of providing stable flow at both high and low flow rates.

As one example, known plug-style regulators use a rubber plug that moves relative to an annular seat within a body of the regulator, which has an opening to control the flow of natural gas. More specifically, when the relevant plug assembly is fully closed, the plug seals against the annular seat to prevent the natural gas from flowing through the regulator. The plug can then be moved away from the seat to allow the natural gas to flow through the regulator via the opening. While such plug-style regulators can operate at high flow rates, the plug must operate in very close proximity to the seat to achieve low flow rates, which may require very precise control of the position of the plug over a range of very minute movements. However, precise and minute movements of the plug can be difficult to control, which can result in poorly metered flow overall, or in pressure cycles that cause the plug to repeatedly contact the seat. In particular, because the plug must operate very close to the seat to achieve a low flow rate, even small drops in demand may cause the plug to inadvertently contact the seat, thereby interrupting the flow of natural gas through the regulator. Thus, the contact between the seat and the plug that can result from conventional operation at low flow rates can cause unwanted disruptions to the flow of natural gas (or other fluid) through the system.

To attempt to alleviate these shortcomings, some plug-style regulators incorporate a cage that surrounds the plug and includes contoured apertures to help control the flow of gas. More specifically, when the plug is moved away from the seat, natural gas can flow through the opening of the seat, and through at least a portion of the apertures, to flow through the regulator. However, the use of these cages is not always sufficient to reliably achieve the necessary turndown. In particular, to allow the plug to operably move within the cage, adequate clearance must be provided between the cage and the plug. But this clearance can provide too large an opening to allow the plug to adequately restrict flow through the regulator at low flow rates. For example, this clearance can result in blowby, wherein some natural gas may escape between the plug and the cage instead of passing through a portion of the apertures that is disposed between the plug and the seat. Further, at low flow rates (i.e., high turndown), the scale of flow through the clearance between a plug and a cage may be of the same or greater magnitude than the flow through the portion of the apertures that is disposed between the plug and the seat. Thus, even with a cage in place, effective operation at low flow rates can lead to interruptions to the downstream supply.

Other known regulators, boot-style regulators in particular, do away with the seat, the plug, and the cage, and instead use a rubber membrane to control the flow of natural gas and thereby provide the necessary turndown. The membrane can be placed over an opening within the regulator, and the membrane can partially lift from the opening to allow the natural gas to pass through the regulator. Because very small portions of the membrane can lift under some operating conditions, high turndown can generally be achievable. However, conventional boot-style regulators typically require that the sensitive rubber membrane be positioned directly in the flow path, where it may be susceptible to excessive wear and damage, including from debris that is entrained in the gas. Such damage can be a common occurrence in conventional systems, and can lead to increased maintenance costs and disruptions to service (e.g., as needed to replace damaged membranes).

Embodiments of the disclosed invention can provide improvements over conventional plug- and boot-style regulators, including by providing a robust regulator that has high turndown, to allow for stable flow of a fluid at both high and low flow rates. For example, a regulator may include a trim assembly comprising a plug that is moveably received within a cage. The plug may be controllably movable relative to both a seat of the regulator and the cage to control the flow of a fluid through a plurality of cage apertures formed in and extending through a peripheral wall of the cage. The plug may also have a seal assembly that may reduce (e.g., eliminate) the clearance between the plug and the cage to appropriately restrict the flow of a fluid through the cage while also ensuring that the regulator can be controlled responsively relative to small changes in (and small magnitudes of) demand.

In some embodiments a regulator may include housing having a cap coupled to a regulator body by a plurality of fasteners (e.g., threaded bolts). The regulator body may include an inlet defining an inlet opening and an outlet defining an outlet opening. The inlet and the outlet may be joined together at an orifice to define a flow path through the regulator. In this way, the inlet may be an upstream portion of the flow path and the outlet may be a downstream portion of the flow path. Additionally, the regulator may include a seat surrounding the orifice. The seat may define a seating surface and may further be configured to receive a portion of a trim assembly (e.g., a cage). In some embodiments, a seat may be integrally formed within the regulator body or the seat may be a separate structure that is received within the regulator body.

In some embodiments, a regulator may include a trim assembly disposed within the regulator (e.g., a regulator body). The trim assembly may be configured to control the flow of a fluid through the regulator and may include an annular cage having a plurality of cage apertures and a plug having a seal assembly. The cage may be secured within the regulator body so that the cage does not move within the regulator body. More specifically, the cage may be received by a seat of the regulator so that a central opening of the cage is aligned with an orifice of the regulator body. For example, a central cage axis of the orifice may be coincident with a regulator axis defined by the central opening of the cage.

Continuing, the plug may be moveably received within the central opening of the cage to move relative to both the cage and the seat. For example, the plug may move towards or away from the seat along the cage axis to control the flow of a fluid through at least a portion of the plurality of cage apertures formed in the cage. More specifically, the plug may move between a closed configuration, wherein a fluid is prevented from flowing from the inlet and to the outlet through the cage, and an open configuration, wherein the fluid is permitted to flow from the inlet and to the outlet via at least a portion of the plurality of cage apertures. The plug may be moved by an actuator (e.g., a diaphragm) that is coupled to or disposed within the regulator.

In a fully closed configuration, the plug may sealingly contact the seat to create a complete seal between the plug and the sealing surface of the seal. In such a closed configuration, the seal assembly may be disposed between the seat and all of the plurality of cage apertures. Further, the seal assembly can be in sealing contact with an interior surface of the cage to create a second seal that may also prevent fluid from flowing through the plurality of cage apertures. Thus, the trim assembly may remain in a closed configuration even if the plug is moved a small distance from the seat surface to completely or partially break the seal between the seating surface and the plug, so long as the plug continues to prevent flow via a seal with the cage.

In the open configuration, the plug may be disposed away from the seat (i.e., moved axially from the seat along a prescribed range of travel) so that at least a portion of the plurality of cage apertures is exposed for flow across the seat. In this regard, in the open configuration, the plug may generally be oriented so at least a portion of one or more of the apertures is disposed between the seat and the seal assembly of the plug to be exposed to flow through the regulator, with the exposed portion of the one or more apertures defining a flow area through which a fluid may pass from the inlet to the outlet of the regulator as a whole. Correspondingly, as the plug moves further from the seat, the flow area may generally increase, depending on the configuration of the apertures, to allow a greater flow rate of fluid through the regulator.

In some cases, the seal assembly may selectively contact the interior surface of the cage to create a seal that may reduce blowby (i.e., a flow of the fluid between the seal assembly and the interior surface of the cage). In this way, for example, the flow of the fluid through the trim assembly can be better controlled, which can help the trim assembly to achieve high turndown. Put another way, because the seal assembly can sealingly contact an inner cage surface of the cage, the seal assembly can reduce (e.g., eliminate) any gaps for unwanted flow between the plug and the cage. This can generally prevent a fluid from passing between the plug and the cage, so that the plug assembly and seat generally only allow fluid to flow through the exposed portions of the apertures of the cage. In some cases, however, a seal assembly may not contact the interior surface of the cage (e.g., over part of a range of travel of a plug), which may result in blowby and consequently higher flow rates of the fluid through the trim assembly.

The seal assembly may be configured to sealingly contact the interior surface of the cage as the plug moves relative to the cage, depending on the location of the plug relative to the seat. More specifically, an exterior surface of the seal assembly may have a size (e.g., a diameter) that is larger than that of the plug body. In this way, for example, the radially outer surface of the seal assembly may contact the radially interior surface of the cage to establish a complete or partial seal. In some cases, the seal assembly may be or may include a resilient member, and the contact between the outer surface of the seal assembly and the interior surface of the cage may accordingly compress the seal assembly radially into the groove.

In some embodiments, a plug may include a plug body (e.g., a cylindrical plug body) defining a circumferential exterior groove and a seal assembly retained within the groove. The plug body may be shaped to be movably received within a cage so that the plug body does not contact the interior surface of the cage. The groove may be configured to receive the seal assembly so that the seal assembly can move radially within the groove.

In some embodiments, a seal assembly may include an outer ring and at least one resilient member. The outer ring may have an outer diameter that is greater than a diameter of the plug body and at least a portion of the interior surface of the cage, and an inner diameter that is smaller than the diameter of the plug body. In this way, for example, the outer ring can be retained within the groove and extend past the outer perimeter of the plug to contact the interior surface of the cage at an outer ring surface and thereby provide a peripheral seal.

In some cases, an outer ring may enclose at least one resilient member within a groove on a plug assembly so that the at least one resilient member may bias the outer ring radially outward of the groove. For example, when the outer surface of an outer ring contacts the interior surface of a cage, the contact may force (e.g., compress) the outer ring to move radially into the groove. Such movement of the outer ring may cause the at least one resilient member to compress within the groove. In turn, the resilient member(s) can provide an opposing force to ensure the outer ring maintains appropriate sealing contact with the interior surface of the cage. In some cases, by thus ensuring that the outer surface of the outer ring maintains appropriate contact with the interior surface of the cage, a complete or partial seal can be appropriately provided even where a size (e.g., a diameter) of the interior surface of the cage varies. However, in some cases, when a plug is moved along a range of travel to a portion of a cage that has an inner diameter that is larger than the outer diameter of the outer surface of the outer ring, the outer ring and the resilient members may fully decompress (as relevant). Correspondingly, in some cases, depending on the local size of a cage, an outer surface of the ring may not form a seal with the cage even when extended to a furthest distance out of the groove.

As generally discussed above, a radially outward bias of a seal assembly can help to ensure that an appropriate seal is provided between a plug assembly and a cage, with corresponding improvement in high turndown operation of a regulator. Similarly, variation in local sizes in cages can allow for a seal assembly on a plug to move with little to no interference from a cage over a select portion of a range of travel. Thus, for example, relatively precise control at low flow rates can be achieved, in combination with relatively low-wear operation at high flow rates.

In some embodiments, a transition region within a cage can help to ensure a relatively smooth and low-wear transition between operation with contact between a seal assembly on a plug and a cage, and operation with no contact between the seal assembly and the cage. For example, in some embodiments, a cage may be an annular cage including a peripheral wall having a central opening that extends between a first cage end and a second cage end. The central opening may be configured to moveably receive a plug and may define an inner cage surface of the cage. The inner cage surface may further define a first sealing portion adjacent to the first cage end and a clearance portion disposed away from and downstream of the first cage end so that the first sealing portion is positioned between the first cage end and the clearance portion.

Continuing, the first sealing portion may have a diameter that is less than that of the clearance portion, and a transition portion may be disposed between the first sealing portion and the clearance portion. The transition portion may define a tapered region of the inner cage surface having a variable diameter, with an end adjacent to and continuous with the first sealing portion (e.g., having a diameter equal to that of the first sealing portion), and another end adjacent to and continuous with the clearance portion (e.g., having a diameter equal to that of the clearance portion). The first sealing portion and the first tapered portion may be configured to contact a portion of a plug assembly (e.g., an outer surface of a seal assembly) to allow the plug assembly to sealingly contact the inner cage surface, depending on the position of the plug. The clearance portion may be configured so that a peripheral seal assembly of a plug is substantially clear (i.e., not in contact with a relevant surface or in contact with 5% or less of the relevant surface relative to a maximum potential contact area with the relevant surface over a relevant course of travel) of the inner cage surface along the clearance portion. Further, the continuous profile of the transition region can help to ensure smooth movement of the plug assembly between these two modes of operation.

Generally, to assist in appropriate regulation of flow through a regulator, a cage may include a plurality of cage apertures defined in a peripheral wall of the cage. The plurality of cage apertures may be configured to allow a fluid to flow through at least a portion of the plurality of cage apertures to allow the fluid to flow through a regulator. In particular, depending on a position of a plug assembly—and, more particularly on a position of a sealing assembly of the plug assembly—a portion of the plurality of cage apertures may be exposed to a flow path through a seat of a regulator (i.e., may extend between a seal assembly of a plug and a seat of the regulator) to define a flow area through which the fluid may flow across the cage. As the plug is moved away from the seat, a greater portion of the plurality of cage apertures may be exposed between the seal assembly and the seat, thereby increasing the available flow area and allowing for higher flow rates through the regulator.

In some embodiments, the configuration of the plurality of cage apertures may be varied to achieve a desired flow characterization. In other words, the plurality of cage apertures can be varied in size, shape, orientation, quantity, etc., between different cages, to achieve for any variety of desired increases in flow rate for a specified range of travel of a plug. Thus, for example, through appropriately configuration of the cage apertures, flow through the cage apertures, and through the regulator in general, can be appropriately varied based on a current position of the plug relative to the seat.

In some embodiments, a cage may include a plurality of cage apertures that may be configured as slots extending between a first cage end and a second cage end. The slots may be elongate slots running parallel to a cage axis and may extend into or through at least one of a sealing portion, a transition portion, or a clearance portion of the cage. The slots may have equal or unequal lengths. Additionally, the slots may be equally or unequally spaced around a perimeter (e.g., a circumference) of a peripheral wall of the cage. Furthermore, the slots may not extend all the way through a sealing portion to allow a seal assembly of a plug to form a complete seal with an inner cage surface.

In some cases, a plurality of cage apertures may be configured as a plurality of slots, wherein each of the slots defines a first portion that may extend from an intersection between a transition portion and a clearance portion of a cage and toward the second cage end. The first portion may terminate prior to reaching the second cage end. For example, the first portion may extend partially into a second sealing portion and terminate before the second cage end. Each of the first portions may have the same length (e.g., a length taken parallel to a cage axis) or they may have different lengths. Additionally, each of the first portions may have a width taken perpendicular to the length, which may be the same or different.

In some embodiments, a profile of a particular cage aperture (e.g., width in the circumferential direction) can vary in the axial direction, so that a particular desired flow characterization can be obtained. In some embodiments, some adjacent cage apertures may have different lengths, as may result in only a subset of the cage apertures being made available for flow (or with a certain flow rate) for an initial movement of a plug assembly. For example, some portions of slots or other cage openings may vary in axial length and can thereby exhibit different lengths of axial extension into a low-flow (or other) portion of a cage.

As another example, some portions of a set of cage apertures may be configured as necked portions having a reduced width relative to other portions of the cage apertures. Due to the smaller width of the narrower portions, an available flow area may increase at a slower rate as a plug passes along the narrower portions as compared to when the plug passes along the other portions. In this way, for example, the narrower portions may define a low-flow portion of the cage, and of a range of travel of the plug, whereas the other portions may define a high-flow portion of the cage, and of the range of travel of the plug.

In some embodiments, the plurality of cage apertures may be configured as a plurality of holes that may be configured in staggered rows of varying length. Additionally, the holes may vary in diameter. In other embodiments, the plurality of cage apertures may be configured (e.g., shaped) to achieve other desired flow characterizations, for example, quick-opening, linear, or equal-percentage flow configurations.

FIG. 1 depicts an example embodiment of a regulator 100 on which aspects of the present disclosure may be practiced. As shown, the regulator 100 can be configured for use as a backpressure regulator or a pressure reducing regulator, depending on a configuration of an associated pilot (not shown), to control the distribution of a fluid (e.g., natural gas) in a distribution system. However, other types of regulators are contemplated for other embodiments. Further, although some discussion below may be presented in the context of operations particular to a pressure reducing regulator, some embodiments of the invention can be similarly used in the context of back pressure regulators.

In the illustrated example, the regulator 100 includes a housing 104 and a trim assembly 106 disposed within the housing 104 to help control the flow of the fluid through the regulator 100. In particular, the trim assembly 106 may be movable between a closed configuration, wherein the trim assembly 106 prevents the fluid from flowing through the regulator 100, and an open configuration, wherein the fluid is permitted to flow through the regulator 100 via the trim assembly 106.

The housing 104 includes a cap 108 and a regulator body 110. The cap 108 is coupled to the regulator body 110 by a plurality of fasteners (e.g., threaded bolts) or other known coupling methods as known in the art. The regulator body 110 includes an inlet 114 defining an inlet opening 116 and an outlet 118 defining an outlet opening 120. As shown, the inlet opening 116 and the outlet opening 120 are oriented so that an inlet axis 122 defined by the inlet opening 116 and an outlet axis 124 defined by the outlet opening 120 are coincident with one another. However, other configurations are also contemplated, including configurations in which an inlet axis and an outlet axis may not be parallel or may not be co-planar.

The regulator body 110 also encloses an orifice 126 formed within the regulator body 110, so that a flow path 128 (see FIGS. 4-7) extends through the orifice 126 to connect the inlet 114 (i.e., an upstream end of the flow path 128) with the outlet 118 (i.e., a downstream end of the flow path 128). For example, the fluid in the inlet 114 may be at a higher pressure than the fluid in the outlet 118 (e.g., as shown with thicker and thinner arrows, respectively in FIGS. 4-7) so that the fluid may flow from the inlet 114 to the outlet 118. In this way, the comparatively high-pressure fluid in the inlet 114 will be reduced in pressure as it passes through the orifice 126 to become the low-pressure fluid in the outlet 118.

The orifice 126 may be a circular hole that defines a regulator axis 130. As shown, the regulator axis 130 is perpendicular to both the inlet axis 122 and the outlet axis 124; however, the regulator axis 130 may be otherwise angled relative to the inlet axis 122 and/or the outlet axis 124. Surrounding the orifice 126 and adjacent to the inlet 114, the regulator body 110 further includes an annular seat 132 having a seating surface 134 configured to receive at least a portion of the trim assembly 106. As shown, the annular seat 132 is a separate structure that is configured to be received within the regulator body 110, but the annular seat 132 may be integrally formed within the regulator body 110 in some embodiments.

The trim assembly 106 includes a cage 136 that is configured to moveably receive a plug 138 of a plug assembly 178, and is disposed along the flow path 128. Thus, the cage 136 generally surrounds the flow path at the orifice 126 to separate the inlet 114 from the outlet 118 along the flow path 128. Correspondingly, the particular configuration of trim assembly 106 can help to regulate the flow of a fluid along the flow path 128 through the regulator 100. More specifically, as will be described in greater detail below, the relative movement between the cage 136 and the plug 138 may help to characterize the flow of the fluid through the regulator for a given inlet pressure (or other flow condition).

Figure 2:
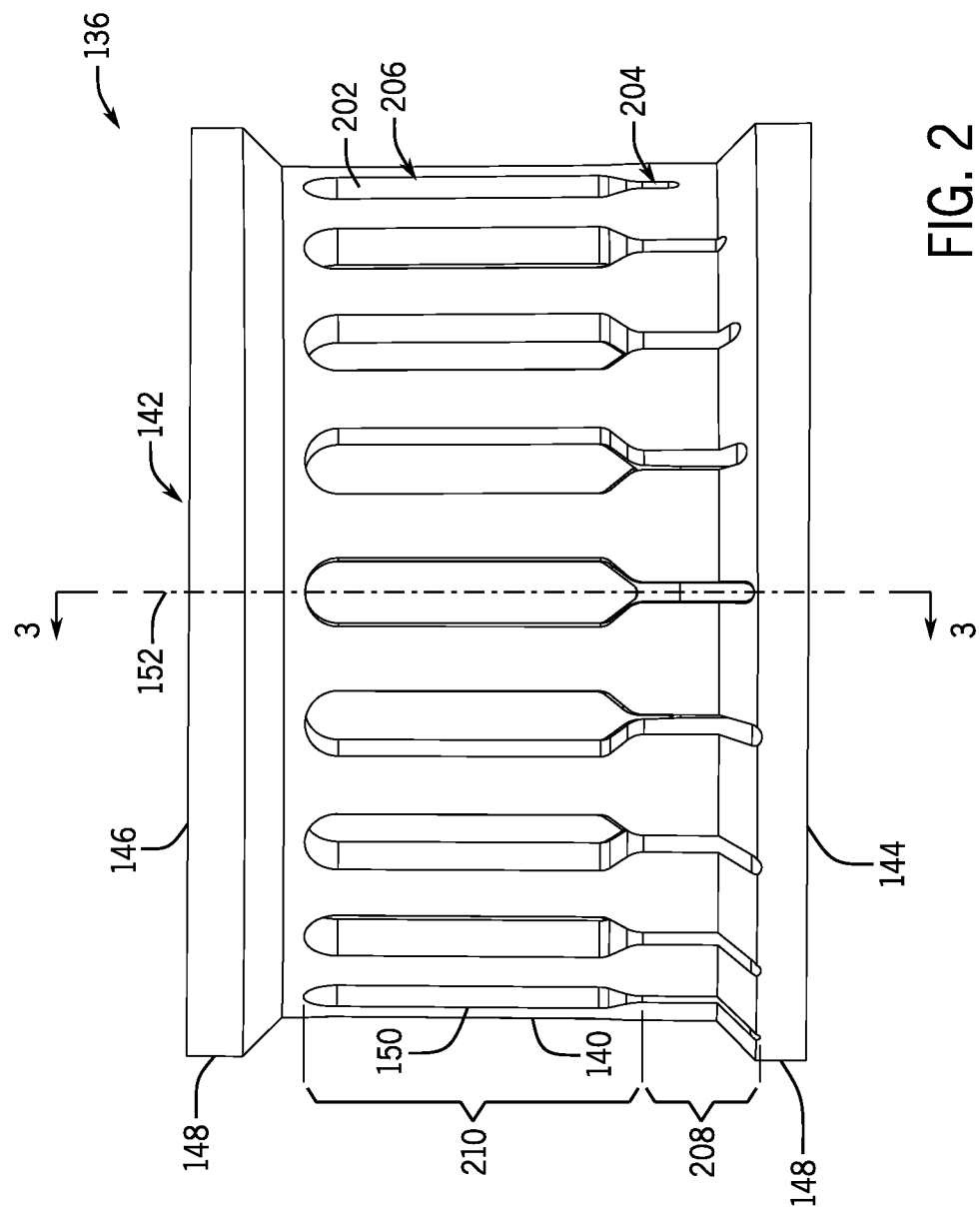
FIG. 2 is a side view of the cage of FIG. 1.
Figure 3:
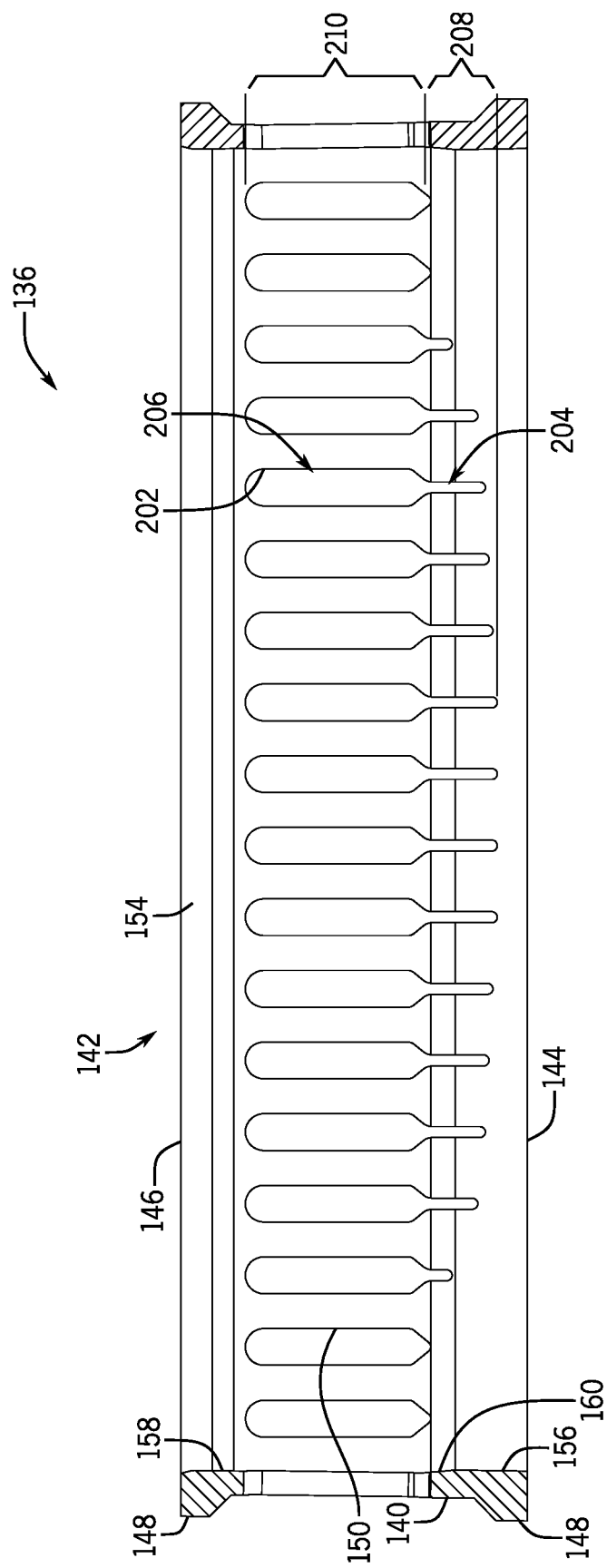
FIG. 3 is a cross-section view of the cage of FIG. 1 taken along line 3-3 of FIG. 2, with the cage flattened to better illustrate certain features.

As shown in FIGS. 2 and 3, in particular, the cage 136 includes an annular body having a peripheral wall 140 that defines a central cage opening 142 extending between a first cage end 144 and a second cage end 146. As shown, each of the first cage end 144 and the second cage end 146 includes a cage flange 148 extending radially from the peripheral wall 140. However, cage flanges may not be present in some embodiments. Additionally, the cage 136 includes a plurality of cage apertures 150 formed in and extending through the peripheral wall 140 to allow the fluid to pass through the cage 136 to flow along the flow path 128 through the regulator 100, depending on the position of the plug 138 (see FIG. 1), as further discussed below. Furthermore, the central cage opening 142 defines a cage axis 152 and is configured to moveably receive the plug 138 so that the plug 138 can be moved axially, relative to the cage 136, along the cage axis 152.

More specifically, the central cage opening 142 defines an inner cage surface 154 (see FIG. 3) that is configured to be sealingly engaged by the plug 138 (see FIG. 1) to control the flow of the fluid through the cage 136, as further discussed below. In this regard, for example, the inner cage surface 154 defines a sealing portion 156 adjacent to the first cage end 144 and a clearance portion 158 disposed away and downstream from the first cage end 144 and beyond the sealing portion 156. Put another way, the sealing portion 156 may be closer to the first cage end 144 than is the clearance portion 158 and the clearance portion 158 may be closer to second cage end 146 than is the sealing portion 156. In some cases, the clearance portion 158 can extend to the second cage end 146, although other configurations are possible, including as discussed below. Additionally, one or more of the cage apertures 150 may extend into both of the sealing portion 156 and the clearance portion 158, although other configurations are also possible.

The sealing portion 156 can generally be configured so that a sealing assembly of the plug 138, as also discussed below, can seat against the inner cage surface 154 of the peripheral wall 140. Thus, for example, a plug assembly can seal, entirely or partially, around a circumference of the sealing portion 156 to control the flow of a fluid through the cage 136. More specifically, the sealing portion 156 may have a diameter that is smaller than a largest diameter of the plug assembly to ensure sealing contact between the plug assembly and the sealing portion 156.

The clearance portion 158 may be disposed beyond the sealing portion 156 so that the clearance portion 158 is closer to the second cage end 146 than is the sealing portion 156. In the embodiment illustrated, the clearance portion 158 has a diameter that is larger than the sealing portion 156 and the plug assembly so that the plug assembly is substantially clear (i.e., not in contact with a relevant surface or in contact with 5% or less of the relevant surface relative to a maximum contact area with the relevant surface over a relevant course of travel) of the inner cage surface 154 along the clearance portion 158, as also further discussed below.

Also as further discussed below, a clearance portion can allow for increased flow of fluid through a cage for some positions of a plug assembly, as well as reduced wear on a plug assembly and more efficient overall operation of a regulator. However, in some embodiments, a clearance portion may not be provided, or a sealing portion of a cage may otherwise extend over a larger axial portion of a cage than is shown for the sealing portion 156, so that a sealing assembly of a plug assembly may seal along a larger axial length of the inner cage surface.

In some cases, including where a cage includes a larger-diameter clearance portion and a smaller-diameter sealing portion, a transition portion may be provided. For example, the inner cage surface 154 may further define a transition portion 160 that extends between and connects the sealing portion 156 with the clearance portion 158. By providing a relatively smooth profile between the portions 158, 160, the transition portion 160 can help provide a smooth transition for a sealing assembly as a plug assembly moves between the clearance portion 158 and the sealing portion 156, including as further discussed below. Correspondingly, for example, the plug 138 can be more easily moved between the clearance portion 158 and the sealing portion 156, with less wear on a sealing assembly.

In the illustrated embodiment, the transition portion 160 provides a region of varying diameter. In particular, the transition portion 160 can have a diameter equal to the diameter of the sealing portion 156 where the transition portion 160 connects with the sealing portion 156, and can have a diameter equal to the diameter of the clearance portion 158 where there transition portion 160 connects with the clearance portion 158. In different embodiments, the diameter of a transition portion may vary linearly or non-linearly along an axial length to provide a smooth transition between a sealing portion and a clearance portion. As shown, the transition portion 160 is tapered so that the diameter varies linearly along the length of the transition portion 160, although other configurations are possible.

Referring again to FIG. 1, in some cases, a trim assembly may further include a cage retainer to help ensure that a cage does not move relative to a regulator body or a seat. In particular, in the illustrated example, a cage retainer 162 is formed as an annular body that defines a retainer opening 164 extending between a first retainer end configured to connect with the cage 136 and a second retainer end configured to connect with the housing 104. The cage retainer 162 extends between the housing 104 and the second cage end 146 so that when the cap 108 is secured to the regulator body 110 the cage retainer 162 may be urged downward by the cap 108 to apply a force to the cage 136 that may secure the cage 136 against the seat 132. Additionally, the central retainer opening 164 may be concentric with the central cage opening 142 and may be configured to moveably receive the plug 138.

The plug 138 includes a plug body 174 and supports a seal assembly 176 that is also included in a plug assembly 178. The plug body 174 may be a generally cylindrical body having an upstream end and a downstream end (i.e., lower and upper ends, as shown), and may include a plug cavity defined in the upstream end, although other configurations are possible. As also mentioned above, the plug 138 is configured to be moveably received within the central cage opening 142 and to move relative to the cage 136 and the seat 132 to control the flow of the fluid along the flow path 128. (As discussed herein, "upstream" and "downstream" portions of a cage of a plug are generally identified based on the flow direction of fluid at a corresponding valve seat cage. Accordingly, for example, the upstream end of the plug 138 is toward the top of the plug 138 in the orientation shown in FIG. 1, because fluid generally flows past the seat 132 in an upward direction.)

To facilitate the movement of the plug 138, the plug 138 may be coupled with a diaphragm 188 positioned between the regulator body 110 and the cap 108. A spring (not shown) may also be provided, to help establish an operating set pressure for the regulator 100. Generally, the diaphragm 188 can move the plug 138 relative to the cage 136, depending on pressure of the fluid at the inlet 114 to control the flow of the fluid along the flow path 128. More specifically, the diaphragm 188 can move the plug 138 over a range of travel relative to the cage 136 and the seat 132 to vary a flow area for flow past the seat 132 (e.g., as discussed below) so that fluid is permitted to flow through the cage 136 to appropriately meet downstream demand. In other embodiments, other known mechanisms to regulate movement of a plug can be similarly employed.

During operation of the regulator 100, when downstream demand increases, the fluid pressure at the outlet 118 may drop, causing the diaphragm 188 to move upwardly toward the cap 108 and thereby moving the plug 138 upward away from the seat 132. As further detailed below, this movement can expose a greater portion of the plurality of cage apertures 150 of the cage 136 to increase the available flow area and thereby allow a higher flow rate through the regulator 100. Conversely, when downstream demand decreases, the fluid pressure within the outlet 118 may increase, thereby causing the diaphragm 188 to move downwardly away from the cap 108 and moving the plug 138 downward toward the seat 132. Also as further detailed below, this movement can block a greater portion of the plurality of cage apertures 150 of the cage 136 to decrease the available flow area and thereby reduce the flow rate through the regulator 100.

To better control the flow of the fluid through the cage 136, including via reduction in blowby (i.e., fluid that undesirably passes between the plug 138 and the cage 136), the seal assembly 176 of the plug 138 may be configured to seal, either partially or entirely, against the inner cage surface 154 depending on the position of the plug 138. More specifically, for the illustrated embodiment, the seal assembly 176 may be configured to sealingly contact the inner cage surface 154 only at the sealing portion 156 and the transition portion 160, although other configurations are possible.

Generally, a sealing assembly in this regard can include a seal member that can be biased (e.g., via its own compressibility or via an additional biasing member) into sealing engagement with an adjacent area on an inner surface of a cage. Thus, for example, blowby may be largely prevented over at least part of a range of travel of a plug relative to a cage, with corresponding improvements in performance, particularly at low flow rates.

Figure 4:
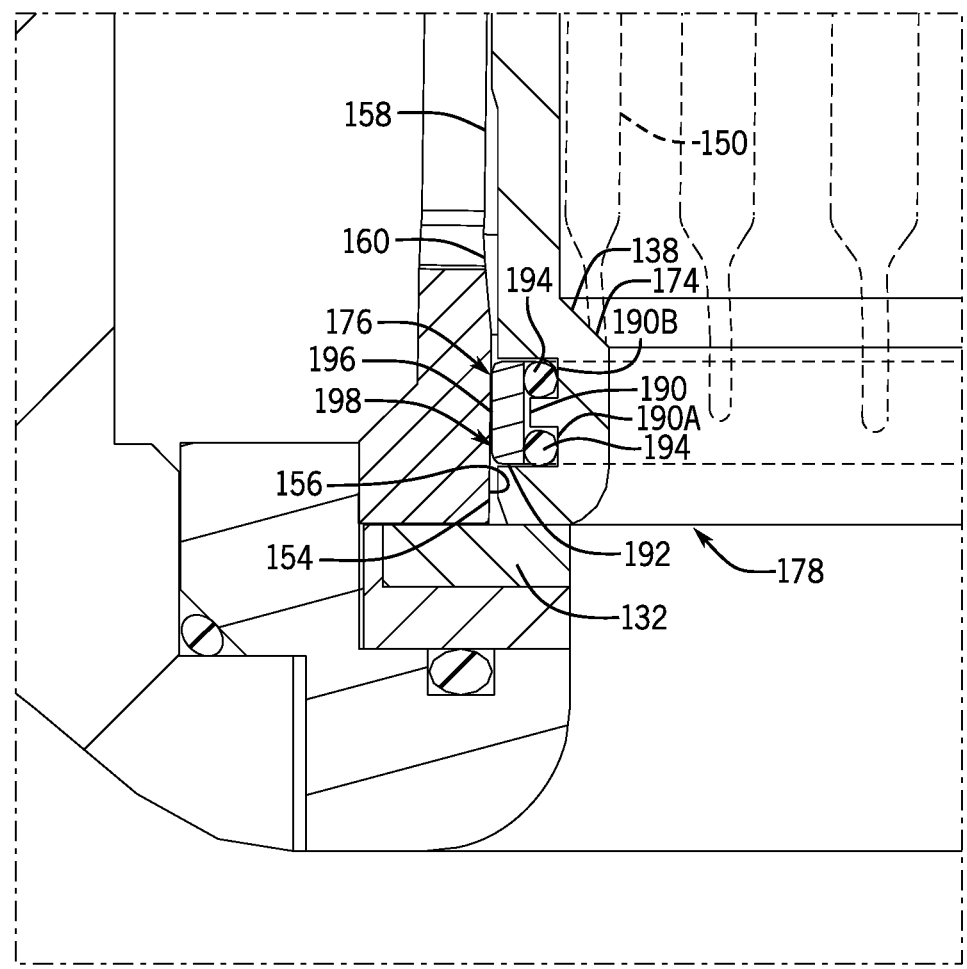
FIG. 4 is a partially schematic, detailed cross-section view of area 4-4 of the regulator of FIG. 1.
Figure 5:
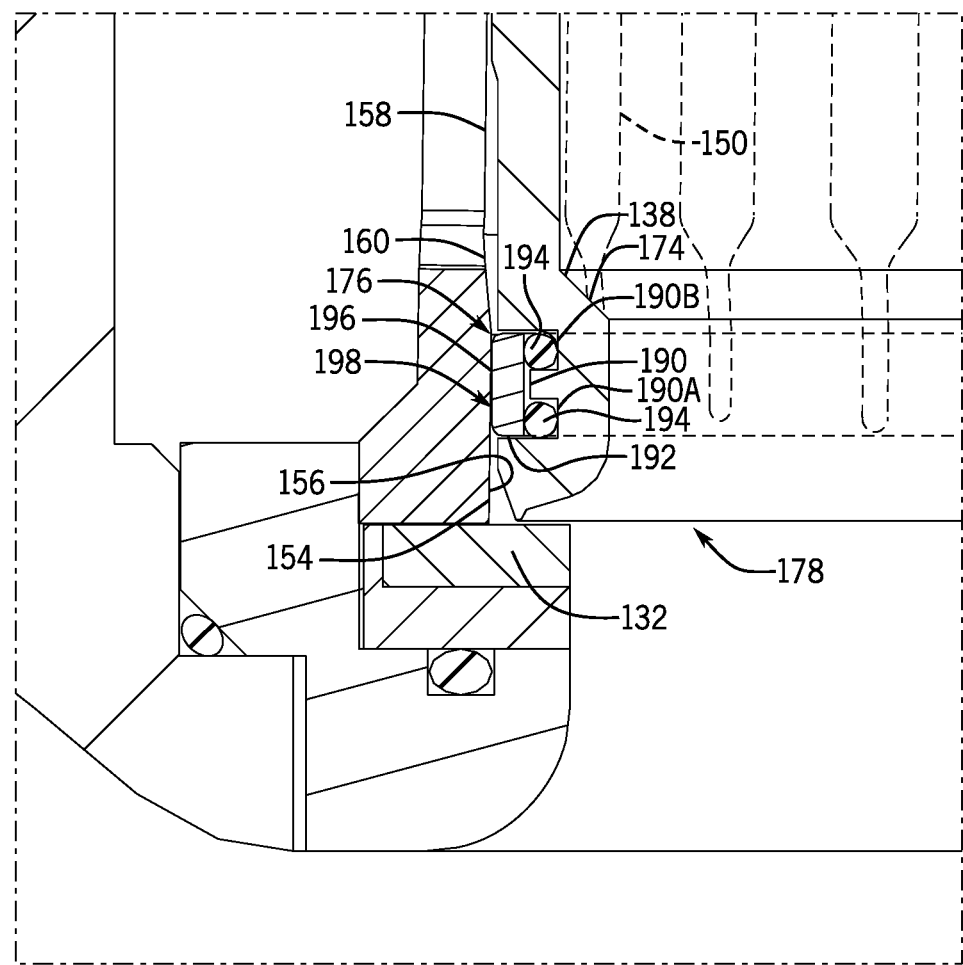
FIG. 5 is a partially schematic, detailed cross-section view of the regulator of FIG. 1, similar to the view of FIG. 4, in another closed configuration.

In the illustrated example, referring in particular to FIG. 4, the plug 138 includes a seal groove 190. As shown, the seal groove 190 is a peripheral, circumferential groove, although other shapes and configurations of seal grooves are also contemplated. That is, the seal groove 190 is an external groove formed in a radially outer periphery of the plug body 174 and positioned proximate the lower end of the plug 138. In this way, for example, the seal assembly 176 may be positioned adjacent to the sealing portion 156 of the cage 136 when the plug 138 is in the fully closed configuration, as shown in FIG. 4. In some cases, the seal groove 190 may be configured to allow radial movement of the seal assembly 176 within the seal groove 190 so that the seal assembly 176 can readily move to sealingly contact the inner cage surface 154, but can also be appropriately compressed, including so as to avoid excessive wear.

Generally, it may be useful to configure a seal assembly to provide a peripheral seal. For example, the seal assembly 176 fully encircles an outer periphery of the plug body 174 to provide a seal between the plug assembly 178 and the inner cage surface 154. In different embodiments, different peripheral sealing elements and biasing elements (as appropriate) can be used. For example, as shown, the seal assembly 176 includes a peripheral sealing element configured as an outer ring 192 that surrounds and encloses two resilient members 194 (e.g., configured as rubber O-rings) within the seal groove 190. More specifically, in the illustrated example, each of the resilient members 194 is retained within a separate sub-groove 190A, 190B, defined in the main seal groove 190. This arrangement may help to improve retention of the seal assembly 176, among other benefits. However, other configurations of seal assemblies are also contemplated. For example, a seal assembly may include more or fewer resilient members and the resilient members may also be configured as other types of resilient members, including linear or wave springs. In some cases, a sealing assembly may include a single sealing element (e.g., a single outer ring similar to the outer ring 192 or otherwise configured). In some cases, a sealing assembly may include a single resilient member (e.g., a single O-ring similar to one of the resilient members 194). In some cases, a peripheral groove on a plug assembly can include only a single channel (e.g., without multiple sub-grooves) that may hold one or more resilient members, one or more sealing elements, or a combination of one or more resilient members and one or more sealing elements.

In some cases, a seal assembly may include a seal member (e.g., a spring-energized seal) but may not include a separate biasing member. In some cases, more than one seal assembly may be used, including in configurations with each seal assembly provided in a separate corresponding seal groove. In different embodiments, different materials can be used for a seal member. For example, the outer ring 192 may be made of a resilient material (e.g., Delrin® plastic or other polymers (Delrin is a registered trademark of DuPont de Nemours, Inc. in the United States or other jurisdictions)).

Continuing with respect to FIG. 4, the outer ring 192 defines an outer ring surface 196 configured to sealingly contact the inner cage surface 154, depending on the location of the plug 138. More specifically, the outer ring surface 196 may have a diameter that is greater than the diameter of the sealing portion 156 and less than the diameter of the clearance portion 158. In this way, for example, a sealing area 198 defined by the outer ring surface 196 can contact the cage 136 around an entire circumference of the sealing portion 156 when the plug assembly 178 is in a fully closed configuration (see FIG. 4), and may not contact the clearance portion 158 at all when the plug assembly 178 is in a corresponding open configuration (see, e.g., FIG. 9). Further, the outer ring surface 196 may at least partially contact the inner cage surface 154 along the transition portion 160 (see FIG. 7), which may allow for the outer ring surface 196 to at least partially seal against the transition portion 160 of the inner cage surface 154. Moreover, an inner diameter of the outer ring 192 may be smaller than the outer diameter of the plug body 174 so the outer ring 192 is retained within the seal groove 190.

With continued reference to FIGS. 1 and 4, the regulator 100 is shown having the trim assembly 106 in a first closed configuration wherein the fluid is prevented from flowing through the regulator 100. In the first closed configuration, which is a fully closed configuration, there may be no downstream demand for the fluid and the plug 138 is in a first position in which the lower end of the plug 138 is in sealing contact with the seating surface 134 of the seat 132. The contact between the lower end of the plug 138 and the seat 132 may establish a main or primary seal that prevents a fluid from passing across the seat 132 and flowing through the plurality of cage apertures 150 of the cage 136.

Further, in the first closed configuration, the seal assembly 176 is also in complete sealing engagement with the cage 136 to provide a secondary seal. The secondary seal may further enhance the ability of the trim assembly 106 to prevent the fluid from flowing through the regulator 100, including during small movements of the plug assembly 178 relative to the seat 132. More specifically, the outer ring surface 196 of the outer ring 192 may be biased into sealing contact with the inner cage surface 154 along an entire circumference of the sealing portion 156 between the first cage end 144 and the plurality of cage apertures 150. Put another way, at least a portion of the outer ring 192 is not axially aligned (i.e., not along the same radial line) with any of the plurality of cage apertures 150, so that no portion of the cage apertures 150 is exposed to form part of a flow path through the regulator 100.

In the illustrated embodiment, the sealing contact between the outer ring 192 and the inner cage surface 154 is maintained because the sealing portion 156 of the cage 136 has a smaller diameter than a resting diameter of the outer ring 192 at the outer ring surface 196, and because of the radially outward bias on the outer ring 192 provided by the resilient members 194. Thus, the sealing portion 156 of the inner cage surface 154 may radially compress the outer ring 192 toward (e.g., into) the seal groove 190 (i.e. radially inward toward the plug body 174). In doing so, the outer ring 192 may then compress each of the resilient members 194, which can provide an opposing force that biases the outer ring 192 against the sealing portion 156 to ensure sealing contact therebetween. In this way, for example, the seal assembly 176 blocks the entirety of the plurality of cage apertures 150 so that the fluid is unable to flow through the plurality of cage 136 apertures to the inlet 114. In some cases, when the seal assembly 176 is disposed within the sealing portion 156, the outer ring 192 and the resilient members 194 may be fully compressed. Put another way, the seal assembly 176 may be fully compressed when located in radial alignment with the sealing portion 156.

As noted above, in some cases, a biased sealing assembly can help to maintain a seal against flow through a regulator when a plug assembly is fully closed against a seat, as well as when the plug assembly has lifted a relatively small amount off of the seat. Turning to FIG. 3, for example, the regulator 100 is shown with the trim assembly 106 in a second closed configuration, in which the plug 138 has moved to a second position along a first range of travel in an opening direction (i.e., upwards, as shown) to displace the plug 138 away from the seat 132. In this position, the trim assembly 106 is still in a closed configuration in that the fluid is prevented from flowing along the flow path 128 due to the seal assembly 176 continuing to form a complete seal along an entire circumference of the sealing portion 156.

More specifically, even though the lower end of the plug 138 is not in contact with the seat 132, the sealing area 198 (of the outer ring 192 of the seal assembly 176) is still in sealing engagement along an entire circumference of the sealing portion 156. Further, an upstream edge of the sealing area 198 of the outer ring 192 (i.e., a bottom edge, as shown) is not axially aligned with any of the plurality of cage apertures 150, so that the sealing engagement with the sealing portion 156 of the cage 136 extends between the plurality of cage apertures 150 and the seat 132. Thus, all of the plurality of cage apertures 150 are blocked so there is no flow area through which a fluid may pass from the inlet 114 to the outlet 118 along the flow path 128. In other embodiments, however, other configurations are possible. For example, as also discussed below, differently configured cage apertures are possible in some cases and, correspondingly, some configurations may result in the opening of a flow path through part of one or more cage apertures immediately upon the lifting of a plug assembly off of a main seat of a regulator.

Figure 6:
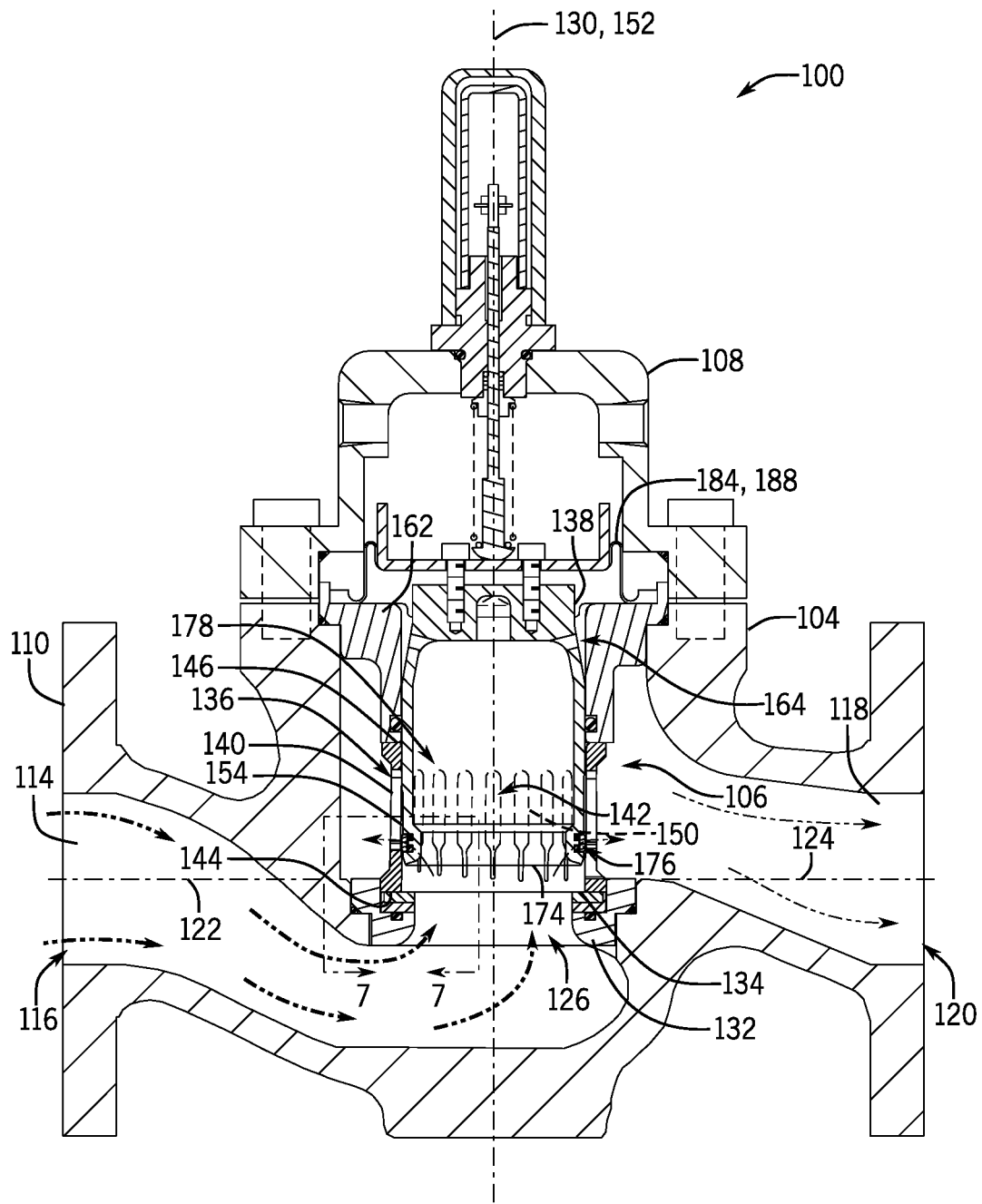
FIG. 6 is a cross-section view of the service regulator of FIG. 1 in an open configuration.
Figure 7:
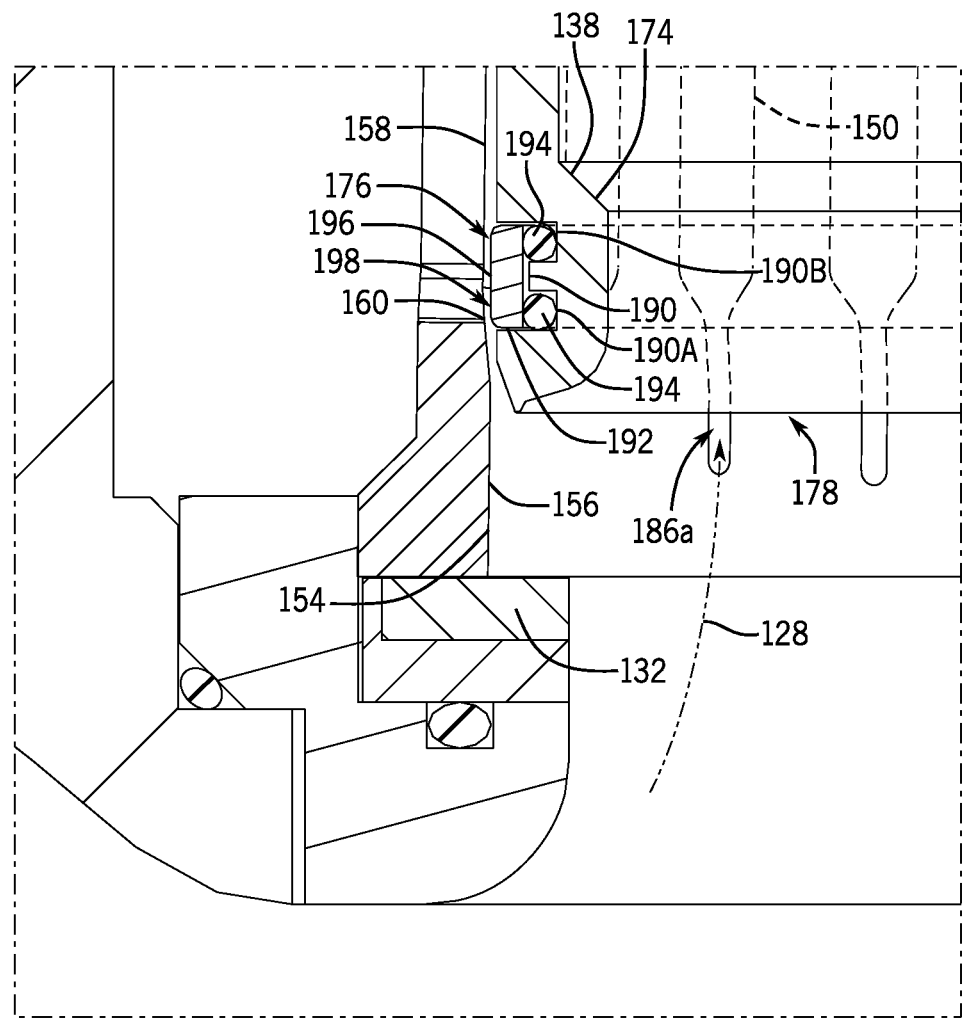
FIG. 7 is a partially schematic, detailed cross-section view of the service regulator of FIG. 1, showing area 7-7 of FIG. 6.

Turning to FIGS. 6 and 7, in response to increased downstream demand for the fluid, the plug assembly 178 may open further, over a second range of travel in the opening direction, to place the plug 138 in a third position. (During actual operation, the position of the plug 138 is not limited to the discrete example positions illustrated herein. Those of skill in the art will recognize that flow effects may vary accordingly, as generally indicated by the discussion herein.) In the third position, the plug 138 is displaced even further from the seat 132 so that the trim assembly 106 is in a first open configuration (which is not necessarily the initial open configuration at which flow through the cage 136 is permitted). In the first open configuration, the outer ring 192 of the seal assembly 176 may be in partial sealing contact along either of the sealing portion 156 or the transition portion 160 of the inner cage surface 154 so that a portion of the plurality of cage apertures 150 are positioned between the seal assembly 176 and the seat 132. In particular, although an upstream section of the outer ring surface 196 of the outer ring 192 may remain axially aligned and in contact with the sealing portion 156 to provide a partial seal, an upstream portion of one or more of the cage apertures 150 is located between an upstream edge of the outer ring 192 and the seat 132, so that a flow area 186a is provided by the exposed portion of the apertures 150. In other words, an upstream end of the outer ring 192 is axially aligned with the plurality of cage apertures 150 so that a portion of the plurality of cage apertures 150 extends between the seal assembly 176 and the first (upstream) end of the cage 136 to provide the relatively limited flow area 186a, through which a fluid may pass to travel along the flow path 128 through the regulator 100.

In contrast to conventional configurations in which a clearance is typically provided between a plug assembly and a cage, the seal assembly 176 may be in at least partial sealing contact with the cage 136 when the plug assembly 178 is in the first open configuration, so that the fluid may generally only pass through the unblocked portions of the plurality of cage apertures 150 (i.e., the available flow area 186a) rather than between the plug assembly and the inner cage surface 154. As also noted above, for example, within the sealing portion 156 (and part of the transition portion 160), the inner cage surface 154 has a smaller diameter than the outer ring surface 196 of the outer ring 192. Thus, particularly under the bias of the resilient members 194, the outer ring 192 may seal against portions of the inner cage surface 154 that extend between each of the plurality of cage apertures 150. In this way, the available flow area 186 can be better controlled than in conventional systems, which can allow the trim assembly 106 to provide greater control over the flow of fluid at low flow rates, with the plug 138 operating in close proximity to the seat 132.

With respect to the transition portion 160 in particular, as the plug assembly 178 continues to move in the opening direction (i.e., upward as shown), despite the increase in diameter of the inner cage surface 154, an upstream portion of the outer ring surface 196 may initially maintain some contact with the inner cage surface 154 due to the radially outward bias provided by the resilient members 194. Put another way, in the transition portion 160, the outer ring 192 and the resilient members 194 may only partially decompress, as further outward movement of the outer ring 192 may be inhibited by contact between the outer ring surface 196 and the inner cage surface 154. Thus, the seal assembly 176 may be partially compressed within part of the transition portion 160. Further, appropriate configuration of the geometry of a transition portion (e.g., a linear transition geometry as shown for the transition portion 160) can provide an additional configurable parameter to implement appropriate flow characterization for high turndown operation.

Figure 8:
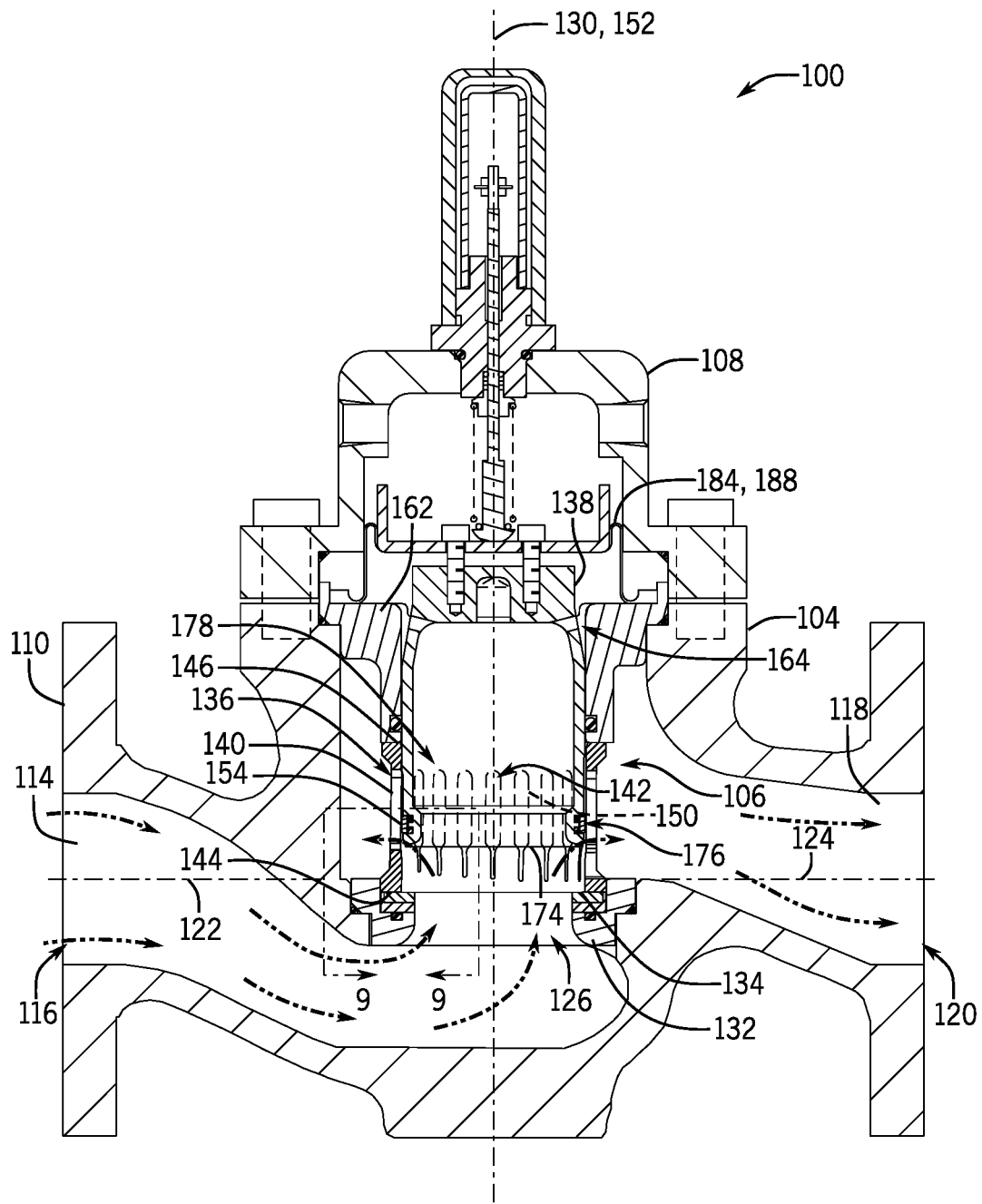
FIG. 8 is a cross-section view of the service regulator of FIG. 1 in another open configuration.
Figure 9:
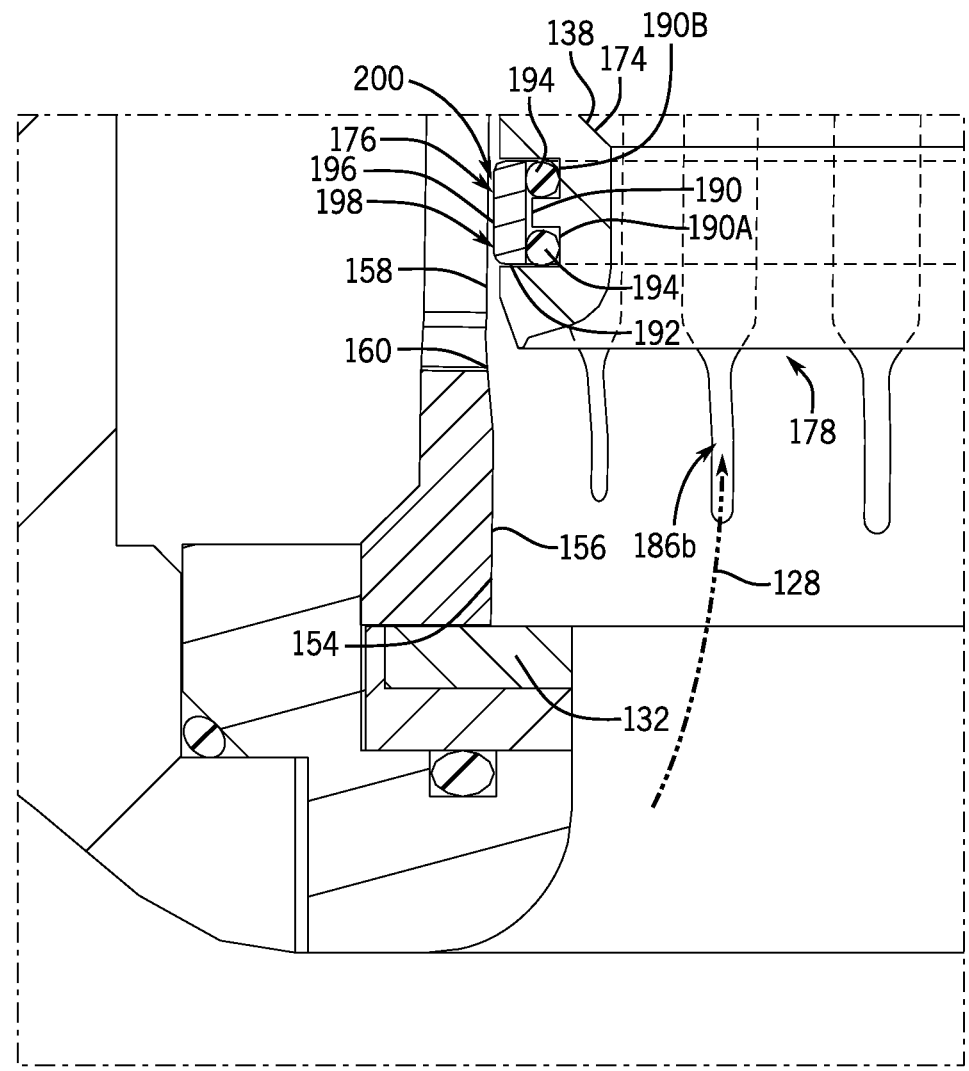
FIG. 9 is a partially schematic cross-section view of the service regulator of FIG. 1, showing area line 9-9 of FIG. 8.

In some cases, with sufficient opening movement of a plug assembly, a clearance may eventually be obtained between a seal assembly and an inner cage surface, as further discussed relative to FIGS. 8 and 9. Conversely, as a plug assembly moves in a closing direction, a transition portion of a cage can help to ensure relatively low-wear compression of a seal assembly included in the plug assembly. For example, as the plug assembly 178 moves in a closing direction (i.e., downward as shown), the gradual transitional geometry provided by the transition portion 160 can ensure that the seal assembly 176 is compressed to form an appropriate seal with the inner cage surface 154 within the sealing portion 156 without necessarily including a hard edge or other high-wear contact point that may result in premature degradation of the outer ring 192.

Turning to FIGS. 8 and 9, in response to increased downstream demand for the fluid, the plug assembly 178 may open still further, over a third range of travel, to place the plug 138 in a third position that is further from the seat 132 than the second position (see FIGS. 6 and 7). With the plug assembly 178 in the third position as shown, the trim assembly 106 is in a second open configuration. In the second open configuration, the outer ring 192 of the seal assembly 176 is axially aligned with the plurality of cage apertures 150 within the clearance portion 158 of the inner cage surface 154. In particular, because the plug 138 has been disposed further from the seat 132, a greater portion of the plurality of cage apertures 150 extends between the outer ring 192 of the seal assembly 176 and the first cage end 144. Thus, a greater portion of the plurality of cage apertures 150 may be unblocked so that an increased available flow area 186b is provided, as can allow a higher flow rate of fluid along the flow path 128. More specifically, in view of the shape and orientation of the cage apertures 150, moving the plug 138 from the second position to the third position causes a non-linear increase in the flow area 186 relative to the movement of the plug 138. However, in other cases, an increase in flow area may be linear or may otherwise change differently than is illustrated for the regulator 100.

Because the diameter of the clearance portion 158 is greater than the diameter of the outer ring surface 196 of the outer ring 192, the outer ring 192 may not seal or contact the inner cage surface 154 within the clearance portion 158. For example, within the clearance portion 158, the seal assembly 176 is fully uncompressed (i.e., each of the resilient members 194 and the outer ring 192 are fully uncompressed) so that there may be a gap 200 between the outer ring surface 196 of the outer ring 192 and the inner cage surface 154. Because the outer ring 192 may not contact the clearance portion 158 of the inner cage surface 154, wear on the seal assembly 176 may be reduced, which may lead to increased longevity of the regulator 100. Additionally, due to the gap 200 between the inner cage surface 154 and the outer ring surface 196 of the outer ring 192, there may be blowby, which may increase the effective flow area 186 to allow for increased flow rates. For example, some of the fluid from the inlet 114 may pass through the gap 200 and into the inlet 114 via the blocked portion of the plurality of cage apertures 150.

It is appreciated that as downstream demand for the fluid decreases, the plug 138 may be moved in an opposite, closing direction, to reduce the available flow area 186 and therefore the flow of the fluid 102. Thus, as demand decreases, the plug 138 can be moved over a range of travel to move the plug 138 toward the seat 132. For example, if the plug 138 were positioned within the clearance portion 158 (see e.g. FIGS. 6-7), the plug 138 may be moved into either of the transition portion 160 or the sealing portion 156 to reduce flow of the fluid (see e.g., FIGS. 4-5). More specifically, when the plug is moved into the transition portion 160, the outer ring surface 196 of the outer ring 192 contacts the inner cage surface 154, which radially compresses the outer ring 192 into the seal groove 190. As the plug 138 continues to move in the closing direction, the outer ring 192 will continue to compress through the transition portion 160 until it becomes fully compressed at the sealing portion. Further, as appropriate in view of downstream demand, the plug 138 may move into a closed configuration (see e.g., FIGS. 1-3).

With reference again to FIGS. 2 and 3, the plurality of cage apertures 150 are shown in greater detail. Although the illustrated configuration of the apertures 150 may provide particular benefits in some cases, including by allowing for relatively precise control of flow for initial opening movements of the plug assembly 178, other shapes, quantities, sizes, spacings, or orientations of cage apertures may be varied in other embodiments to provide different flow characterizations (i.e., different relationships between the distance that a plug assembly is displaced from a seat and the corresponding flow area provided or flow rate of fluid permitted for a given pressure drop).

As shown, the plurality of cage apertures 150 are configured as a plurality of slots 202 of varying length that are equally spaced around a circumference of the peripheral wall 140 and extend in an elongate direction that is parallel to the cage axis 152. Each of the slots 202 includes a first portion 204 that extends toward the second cage end 146 (i.e., upward as shown) from an intersection of the transition portion 160 and the clearance portion 158 (see FIG. 3). Additionally some of the slots 202 include a second portion 206 that extends toward the first cage end 144 (i.e., downward as shown) from the intersection between the transition portion 160 and the clearance portion 158 (see FIG. 3). Put another way, the second portions 206 may be continuous with and extend opposite from the respective first portions 204. Further, for the installation orientation illustrated in FIGS. 4 through 9, the second portions 206 form upstream ends of the slots 202 and the first portions 204 form downstream ends of the slots 202. However, in other embodiments the first portions 204 and the second portions 206 may not be continuous, including so that the second portions 206 are upstream slots, and the first portions are separate downstream slots.

Similarly, in some cases a transition between different portions of slots (e.g., portions with different circumferential widths or other flow profiles) may be differently located than illustrated for the slots 202. For example, in other configurations each of the first portions 204 may also begin anywhere within any of the sealing portion 156, the transition portion 160, or the clearance portion 158 so that they may extend anywhere between the first cage end 144 and the second cage end 146. Likewise, although each of the slots 202 is shown as terminating before reaching the cage ends 144, 146, with each of the first portions 204 having an equal axial length and an equal circumferential width, in other embodiments, the first portions may have different lengths and different widths.

Generally, flow profiles (i.e., geometric profiles that define a flow area for a given position of a plug assembly) for different portions of particular cage apertures can be configured to vary in any number of ways, in order to provide different flow characteristics at different lift heights of a plug assembly and, accordingly to provide different overall flow characterizations for a particular regulator. In the illustrated example, each of the second portions 206 may be configured as necked portions with a width that is less than the width of the associated first portion 204. Generally, the relative widths of each of the first portions 204 and the second portions 206 may be varied in different embodiments to achieve a particular desired flow characterization. For example, a ratio of the width of the second portions 206 to the width of the first portions 204 may range from 0.1 to 0.9. In some cases, it may be beneficial to provide a reduced-width portion of a cage aperture that is as narrow as possible, within the limits of manufacturability.

In some cases, portions of adjacent (or other) cage apertures can extend by different lengths, including as may result in extension of the cage apertures by different amounts into a transition, sealing, or clearance portion of a cage. For example, with specific reference to FIG. 3, moving from left to right, the first two slots do not include second portions and do not extend into the sealing portion 156. Starting at the third slot from the left, however, the length of the second portions 206 gradually increases towards the middle slot 202 and then gradually decreases again to the second to last slot 202, with the second portions 206 extending by correspondingly varied amounts into the sealing portion 156. Finally, the last two slots 202 to the right do not include second portions, similar to the first two slots 202 noted above. In this way, for example, the cage 136 can provide particularly favorable characteristics during increased turndown. In particular, as the plug 138 moves away from the seat 132, the available flow area 186 can be increased more gradually than if all of the plurality of slots 202 were the same length or if all of the plurality of slots 202 were the same width. Further, as noted above, other configurations of cage apertures in other embodiments can be varied, as desired, to provide other beneficial flow characterization.

Figure 10:
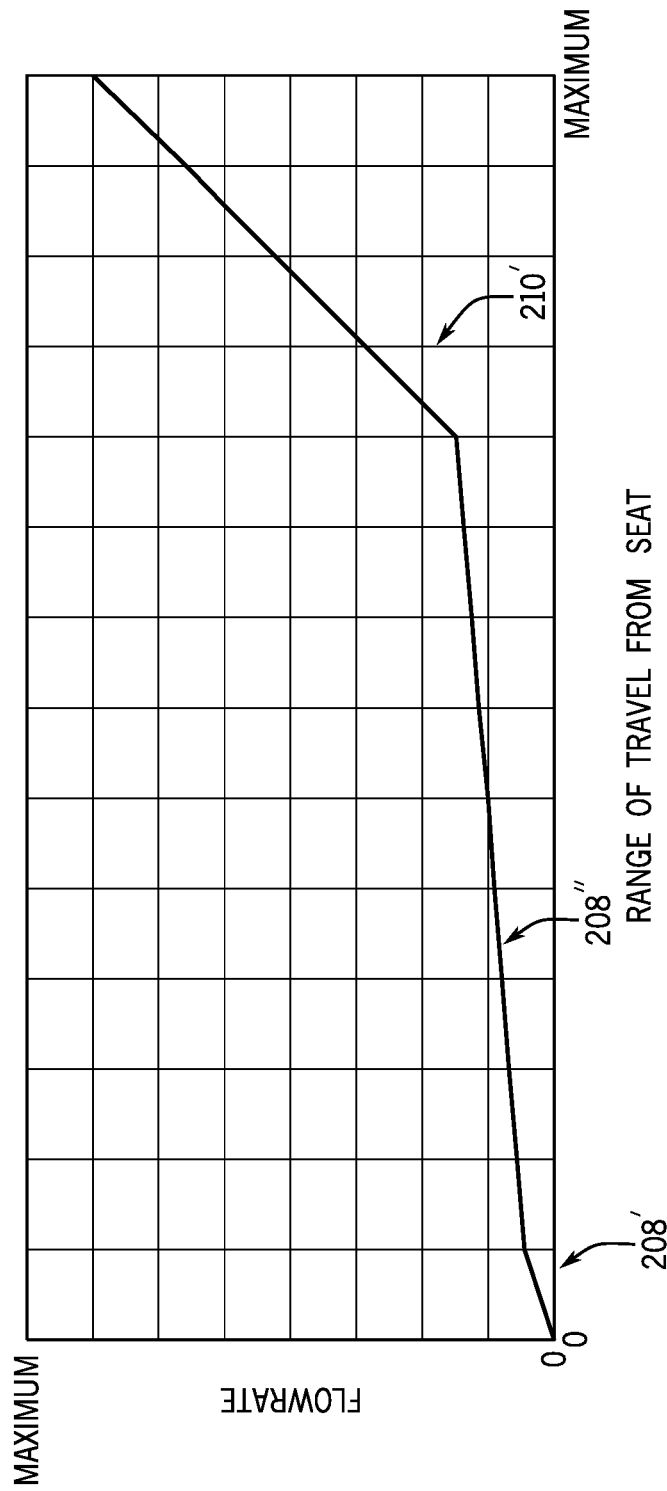
FIG. 10 is a plot showing a flow characterization provided by the cage of FIG. 1.

With additional reference to FIG. 10, a flow characterization for the regulator 100 is illustrated, as determined in part by the configuration of the cage apertures 150 and the plug assembly 178. In particular, the relatively small flow area provided by the second portions 206 of the slots 202 (see FIGS. 2 and 3) may collectively define a low-flow portion 208 of the cage 136, with a corresponding low-flow portion 208' of the flow characterization curve (see FIG. 10). In contrast, the relatively larger flow area provided by the first portions 204 of the slots 202 (see FIGS. 2 and 3) may collectively define a high-flow portion 210 of the cage 136, with a corresponding high-flow portion 210' of the flow characterization curve (see FIG. 10). Correspondingly, the low-flow portions 208, 208' correspond generally with an alignment of the sealing assembly 176 with the sealing portion 156 and at least part of the transition portion 160 of the cage 136 (see, e.g., FIG. 7), and the high-flow portions 210, 210' correspond generally with an alignment of the sealing assembly 176 with the clearance portion 158 of the cage 136 (see, e.g., FIG. 9). Further, due to the particular geometry of the cage 136, and the slots 202 in particular, the flow characterization curve for the regulator 100 defines a further low-flow transition portion 208", over which flow increases at an intermediate rate relative to movement of the plug 138.

More specifically, with reference collectively to FIGS. 1 through 10, as the plug 138 moves away from the seat 132, the fluid may first flow only through a portion of the second portions 206 of the plurality of slots 202, as reflected in the portion 208' of the flow characterization curve. As the plug 138 continues to move away from the seat 132, additional second portions 206 may become unblocked to increase the available flow area 186, thereby increasing the flow rate of the fluid through the cage 136, as reflected in the changed slope of the flow characterization curve at the transition to the portion 208". In this way, for example, the plug 138 may have to move over a longer range of travel to achieve the same increase in flow rate than would be required if the second portions 206 were all the same length. Correspondingly, relatively precise control can be achieved even for low flow rates. Further, by increasing the range of travel needed to achieve a desired increase in flow rate, the plug 138 can be operated further away from the seat 132, which can increase flow stability at low flow rates by reducing the risk of the plug inadvertently contacting the seat 132 and cutting off flow. Moreover, the regulator 100 may be more responsive to small changes in demand in low flow rate scenarios.

Eventually, the plug 138 may move into the high-flow portion 210, corresponding to the portion 210' of the flow characterization curve. In the high-flow portion 210, the wider widths of the first portions 204 allow the flow rates to increase at a faster rate than in the low-flow portion 208, as reflected in the increased slope of the flow characterization curve at the portion 210'. Put another way, for a given range of travel of the plug 138, the wider widths of the first portions 204 result in the available flow area increasing by a greater amount (i.e., at a faster rate) than for the same range of travel within the low-flow portion 208. This increase in available flow area 186 can be increased even further where the plug 138 is in the clearance portion 158, due to the gap 200 (see FIG. 9) allowing some blowby so that some fluid may pass through the cage 136 via portions of the plurality of slots 202 that would otherwise be blocked by the plug 138 if the plug 138 were aligned with the sealing portion 156.

Figure 11:
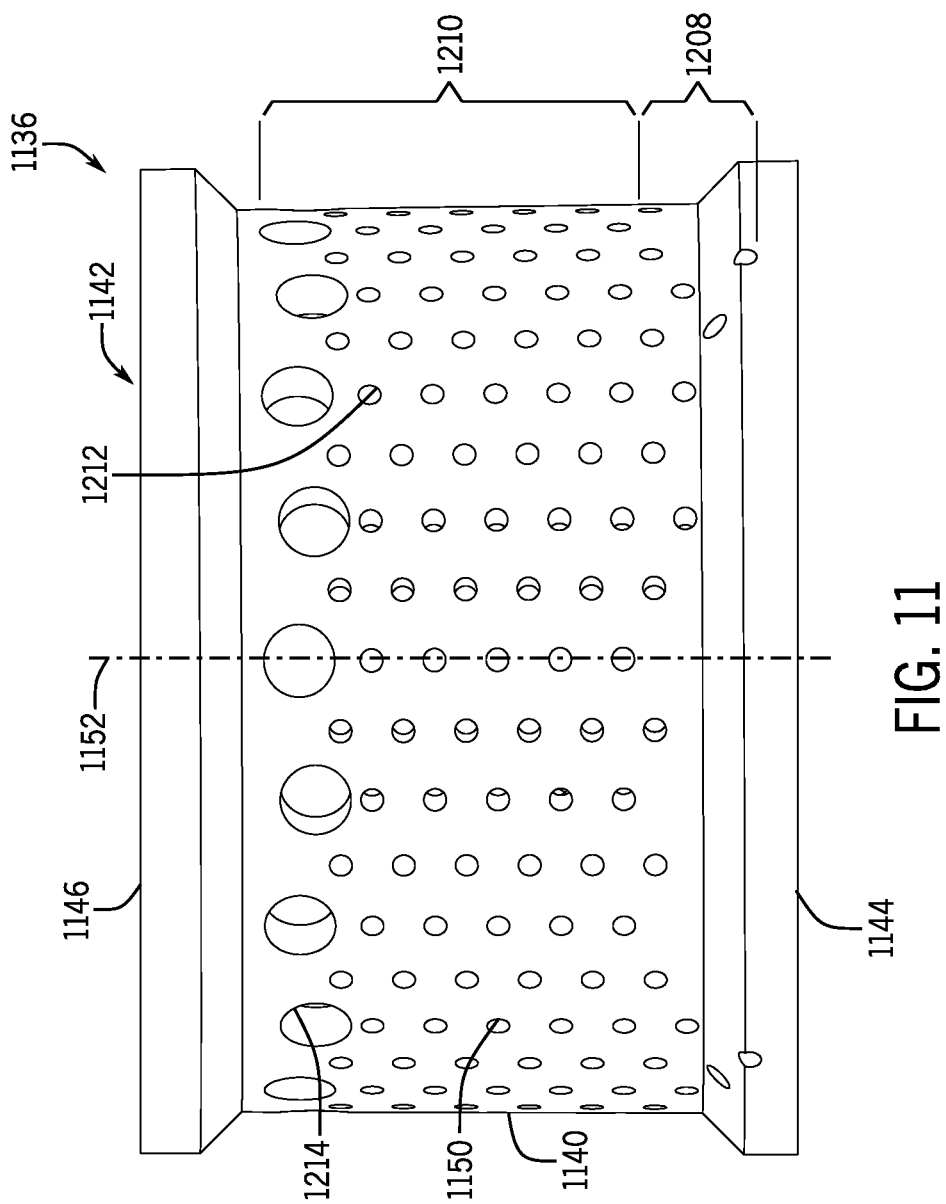
FIG. 11 is an isometric view of another embodiment of a cage according to the invention.

As mentioned above, the shape and quantity of the plurality of cage apertures may be varied in different embodiments to achieve a desired flow characterization. For example, FIG. 11 depicts another example embodiment of a cage 1136 according to aspects of the disclosure. The cage 1136 is generally similar to the cage 136 and includes a peripheral wall 1140 defining a central cage opening 1142 that extends between a first cage end 1144 and second cage end 1146, and defines a cage axis 1152. Additionally, the peripheral wall 1140 has a plurality of cage apertures 1150. However, the plurality of cage apertures 1150 are configured as a plurality of round holes 1212, in a regular array.

In particular, the holes 1212 each have a circular shape and are distributed in axially staggered rows that extend parallel to the cage axis 1152. The length of each of the rows varies so that some of the rows extend closer to the first cage end 1144 than others. Further, the size of the holes 1212 may vary. For example, a portion of the rows include a larger hole 1214 disposed at a respective end of the row that is closest to the second cage end 1146. In this way, for example, the cage 1136 can be configured to have a low-flow portion 1208 and a high-flow portion 1210, which may allow the cage 1136 to provide for improved turndown, similar to the cage 136. For example, the low-flow portion 1208 may correspond with an upstream portion into which the rows extend by varying amounts, and the high-flow portion 1210 may correspond with a downstream portion over an entire length of which all of the rows, and which also includes the larger holes 1214. In some cases, in addition to improved turndown performance, the use of cage apertures configured similarly to the holes 1212 can beneficially reduce noise during operation.

Figure 12:
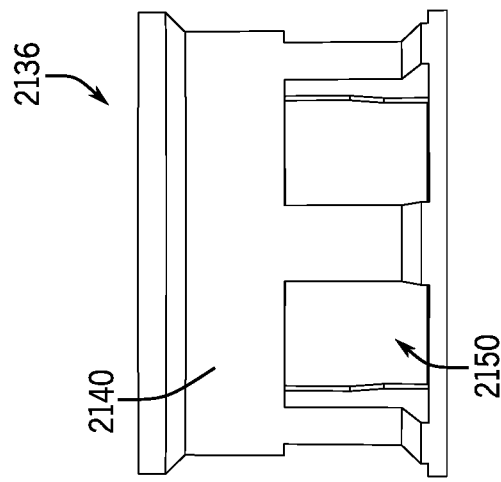
FIG. 12 is an isometric view of another embodiment of a cage according to the invention.
Figure 15:
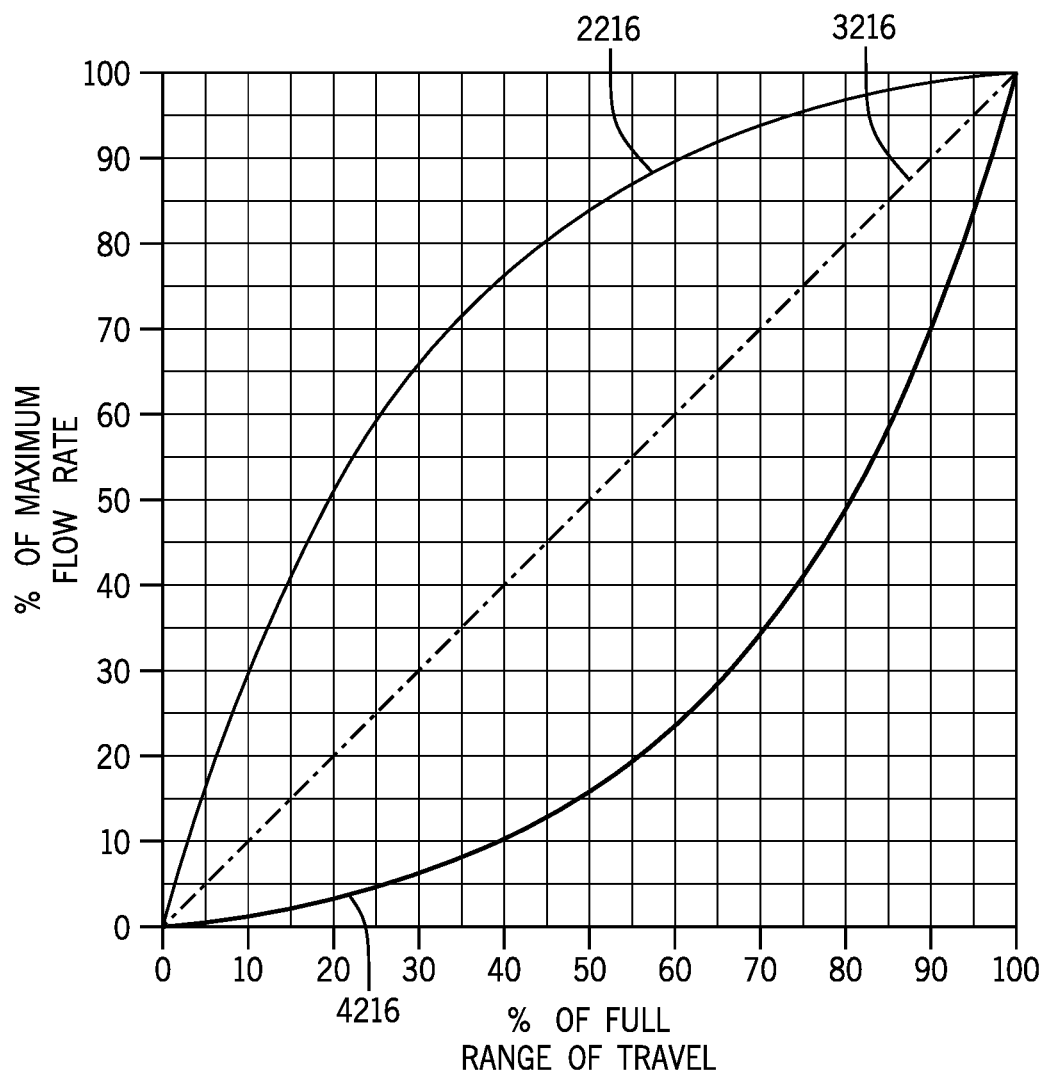
FIG. 15 is a plot showing flow characterizations for the cages shown in FIGS. 12-14.

As also noted above, a variety of other known aperture configurations can also be used in combination with a sealing arrangement as disclosed herein, in order to achieve other flow characterizations. For example, FIG. 12 shows a cage 2136 having a generally known profile to provide a quick-opening flow characterization that allows for rapid increases in flow rates for a small range of travel of a plug within the cage 2136. For example, the cage 2136 may provide a flow characterization reflected in line 2216 of FIG. 15. Generally, to provide for such a quick-opening flow characterization, the cage 2136 may have a peripheral wall 2140 that includes a plurality of large cage apertures 2150 configured as squares or other shapes that provide for a large increase in flow area even with small ranges of travel of a plug (e.g., the plug 138).

Figure 14:
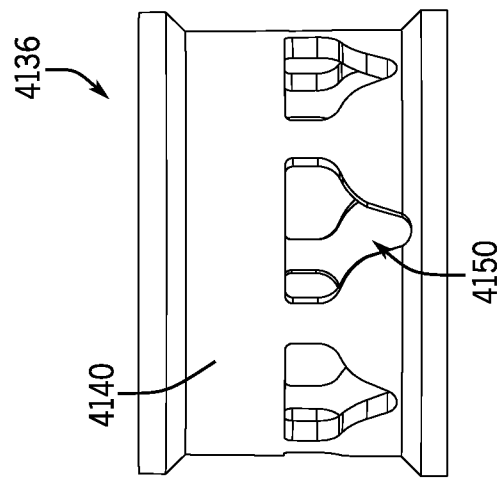
FIG. 14 is a perspective view of another embodiment of a cage according to the invention.
Figure 13:
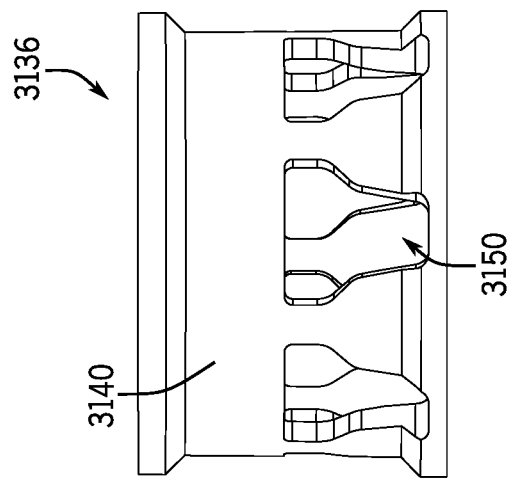
FIG. 13 is an isometric view of another embodiment of a cage according to the invention.

As another example, FIG. 13 shows a cage 3136 having a generally known profile to provide a linear flow characterization. To provide for a linear flow characterization, the cage 3136 has a peripheral wall 3140 with a plurality of cage apertures 3150 that are configured (i.e., shaped) to provide for a linear increase in flow rate with respect to a range of travel of a plug, as reflected in line 3216 of FIG. 15. As still another example, FIG. 14 show another cage 4136 having a generally known profile to provide an equal percentage flow characterization. To provide for an equal percentage flow characterization, the cage 4136 has a peripheral wall 4140 with a plurality of cage apertures 4150 that are configured so that the flow rate increases exponentially with respect to a range of travel of a plug, as reflected in line 4216 of FIG. 15.

Figure 16:
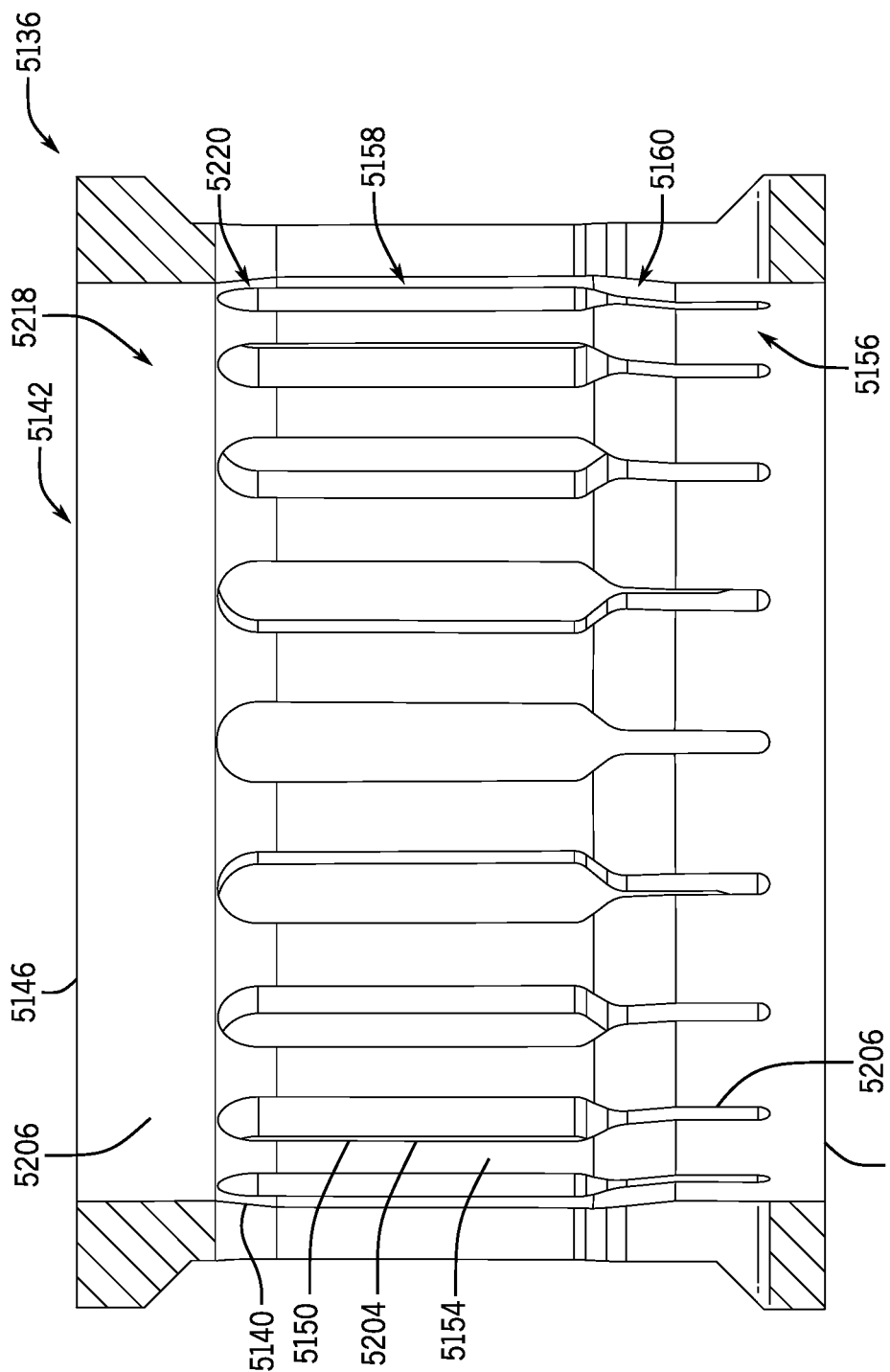
FIG. 16 is cross-section view of another embodiment of a cage according the invention.

While some cages may provide only a single flow characterization, other cages may be configured to provide multiple flow characterizations, depending on the installed orientation of the cages. For example, some cages can be configured to be selectively installed in reversed orientations (e.g., flipped upside down) to provide a second flow characterization, which may be different or the same as a first flow characterization. For example, FIG. 16 shows an example cage 5136 that may be used with the regulator 100 or another regulator. The cage 5136 is configured to selectively provide a first flow characterization in a first orientation (e.g., with flow from bottom to top, relative to the illustrated orientation) and a second flow characterization in a second orientation (e.g., with flow from top to bottom, relative to the illustrated orientation).

Generally, the cage 5136 is similar to the cage 136 and has a peripheral wall 5140 that defines a central cage opening 5142 extending between a first cage end 5144 and a second cage end 5146. The central cage opening 5142 defines an inner cage surface 5154 having a first sealing portion 5156 adjacent to the first cage end 5144, a clearance portion 5158 toward the axial center of the cage 5136, and a first transition portion 5160 extending between and connecting the first sealing portion 5156 with the clearance portion 5158.

However, the inner cage surface 5154 further defines a second sealing portion 5218 adjacent to the second cage end 5146 and a second transition portion 5220 extending between and connecting the second sealing portion 5218 with the clearance portion 5158. Accordingly, the clearance portion 5158 is disposed between the first sealing portion 5156 and the second sealing portion 5218 so that the cage 5136 can be selectively positioned within a regulator in either of a first orientation and a second orientation, so that either of the cage ends 5144, 5146 is an upstream end of the cage 5136. For example, in the first orientation, the cage 5136 may be oriented within the regulator 100 so that the first cage end 5144 is in contact with the seat 132 (see FIG. 1). Conversely, in the second orientation, the cage 5136 may be flipped upside down so that the second cage end 5146 is in contact with the seat 132. The second sealing portion 5218 is similar to the first sealing portion 5144 and the second transition portion 5220 is similar to the first transition portion 5160 in the illustrated embodiment, although other configurations are possible, including as may provide for different overall flow characterizations depending on the installed orientation of the relevant cage.

As mentioned, the cage 5136 may provide for a different flow characterization in each of the first orientation and the second orientation depending on the configuration of the relevant cage apertures, transition portions, clearance portions, or other features, particularly relative to a relevant seal assembly (e.g., the seal assembly 176 of FIG. 1). As shown in FIG. 16, the cage 5136 includes a plurality of cage apertures 5150 formed as slots in the peripheral wall 5140. Similar to the plurality of cage apertures 150, each of the cage apertures 5150 have a first, wider portion 5204 and a second, narrower portion 5206. However, for each of the slots 5202, the narrower portion 5206 generally have the same length. Thus, the narrower portions 5206 extend from the wider portions 5204 into the sealing portion 5156 to provide a corresponding low-flow region.

Due to the shape and orientation of the apertures 5150, the cage 5136 may provide a first flow characterization in the first orientation and a second flow characterization in the second orientation. In particular, the first flow characterization may be similar to that of the cage 136 (see FIG. 10) and the second flow characterization may be similar to the quick-opening characterization of the cage 2136 (see line 2216 in FIG. 15). However, other flow characterizations are possible in each of the first and second orientations, including as may be obtained with differently configured apertures.

Figure 17:
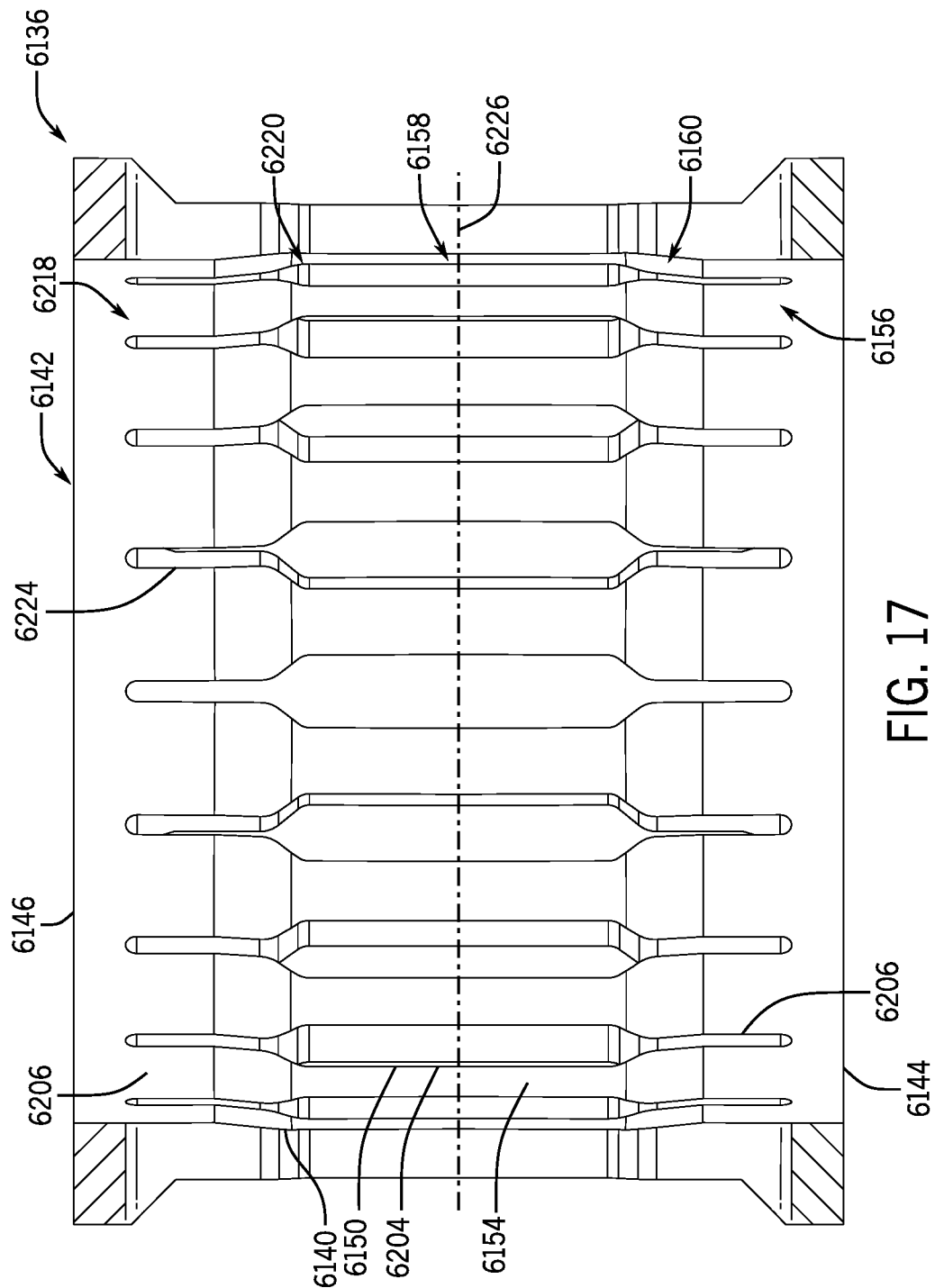
FIG. 17 is a cross-section view of another embodiment of a cage according to the invention.

Additionally, some cages may be configured to provide the same flow characterization regardless of the installed orientation of the cage. For example, FIG. 17 shows another example cage 6136 that may be used with the regulator 100 or another regulator. The cage 6136 is configured to provide the same flow characterization in both a first orientation (e.g., with flow from bottom to top, relative to the illustrated orientation) and a second, reversed orientation (e.g., with flow from top to bottom, relative to the illustrated orientation). Because the cage 6136 can provide the same flow characterization in both orientations, assembly error can be avoided, and the life of the cage may also be increased because the cage 6136 can be reversed if damaged.

Generally, the cage 6136 is similar to the cage 5136 and includes a peripheral wall 6140 that defines a central cage opening 6142 extending between a first cage end 6144 and a second cage end 6146. The central cage opening 6142 defines an inner cage surface 6154 having a first sealing portion 6156 adjacent to the first cage end 6144, a clearance portion 6158 toward the axial center of the cage 6136, and a first transition portion 6160 extending there between. In addition, the inner cage surface 6154 further defines a second sealing portion 6218 adjacent to the second cage end 6146 and a second transition portion 6220 extending between and connecting the second sealing portion 6218 with the clearance portion 6158.

Furthermore, the cage 6136 includes a plurality of cage apertures 6150 formed as slots in the peripheral wall 5140. Similar to the plurality of cage apertures 5150, each of the cage apertures 6150 have a first, wider portion 6204 and a second, narrower portion 6206 disposed proximate the first cage end 6144. However, the cage apertures 6150 further include a third, narrower portion 6224 disposed proximate the second cage end 6146. The third portions 6224 are mirror images of the second portions 6206. Put another way, the cage 6136 is symmetrical about a horizontal plane 6226 parallel to and passing between the first cage end 6144 and the second cage end 6146. In this way, the cage 6136 can provide the same flow characterization in both the first orientation and in the second orientation.

Although a symmetrically configured cage can have particular benefits, including as discussed for the cage 6136, other configurations can include variation on different sides of a reference plane or axis. For example, some cages may exhibit apertures with two or more narrower portions somewhat similarly arranged as shown in FIG. 17, but configured to provide different flow characterizations depending on the orientation of the cage (e.g., whether installed in a first orientation or a second, reversed orientation). Similarly, some cages can include inner cage surfaces with different configurations of one or more transition portions than are, for example, shown in FIG. 17.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

The invention claimed is:

1. A regulator comprising:
   a regulator body defining an inlet and an outlet;
   a seat disposed within the regulator body, along a flow path between the inlet and the outlet;
   a plug assembly that is moveable relative to the seat to regulate flow along the flow path, the plug assembly including a plug and a peripheral sealing element; and
   a cage having a peripheral wall that defines a central opening and includes a plurality of cage apertures that extend through the peripheral wall, the cage surrounding the flow path adjacent to the seat and being configured to moveably receive the plug within the central opening;
   wherein the peripheral sealing element is configured to contact an inner surface of the peripheral wall over a range of travel of the plug assembly to vary a magnitude of a flow area of the cage apertures that is included in the flow path depending on the position of the plug assembly along the range of travel, the inner surface defining a sealing portion, a clearance portion that is farther from the seat than is the sealing portion, and a tapered transition portion extending between the sealing portion and the clearance portion, the sealing portion being configured to provide a first radial clearance relative to the peripheral sealing element that is smaller in a radial direction than a second radial clearance provided by the clearance portion relative to the peripheral sealing element, and at least one of the plurality of cage apertures extending from the clearance portion through the tapered transition portion and into the sealing portion to permit flow through the cage at the sealing portion.

2. The regulator of claim 1, wherein the plug assembly is moveable between a first position along the range of travel, in which the flow area is a first flow area, and a second position along the range of travel, in which the plug assembly is farther from the seat than in the first position and the flow area is a second flow area that is larger than the first flow area.

3. The regulator of claim 2, wherein, with the plug assembly in the first position, at least part of a sealing area of the peripheral sealing element is not axially aligned with the cage apertures;
wherein, with the plug assembly in the second position, an upstream edge of the sealing area of the peripheral sealing element is axially aligned with the cage apertures.

4. The regulator of claim 3, wherein the plug assembly is also movable to a third position along the range of travel, in which the plug assembly is farther from the seat than in the first and second positions; and
wherein, movement of the plug assembly from the second position to the third position causes a non-linear increase in the flow area relative to the movement of the plug assembly.

5. The regulator of claim 4, wherein at least one of the cage apertures includes an upstream portion and a downstream portion, the downstream portion having a larger circumferential dimension than the upstream portion.

6. The regulator of claim 1, wherein the peripheral sealing element is configured to contact the inner surface along the sealing portion to block flow across the seat; and
wherein the peripheral sealing element is substantially clear of the inner surface along the clearance portion to permit flow across the seat.

7. The regulator of claim 1, wherein the inner surface at the sealing portion has a diameter that is smaller than a diameter of the inner surface at the clearance portion.

8. The regulator of claim 1, wherein the plug assembly defines a circumferential groove and the peripheral sealing element is retained by the groove.

9. The regulator of claim 1, wherein the peripheral sealing element is biased radially outwardly relative to the plug.

10. The regulator of claim 9, wherein the peripheral sealing element includes a ring having an outer diameter that is larger than the diameter of the plug; and
wherein one or more resilient members are disposed within a groove of the plug assembly to bias the ring radially outwardly.

11. The regulator of claim 1, wherein at least one of the cage apertures includes a downstream portion and an upstream portion, with a flow profile of the downstream portion being different than a flow profile of the upstream portion.

12. The regulator of claim 11, wherein the downstream portion includes a first portion with a first width and the upstream portion includes a second portion with a second width, the first width being larger than the second width, and the first portion being continuous with the second portion.

13. The regulator of claim 11, wherein the cage is configured to be selectively installed in the regulator body in either of a first orientation or a second orientation that is reversed relative to the first orientation; and
wherein the flow area changes differently depending on the position of the plug assembly along the range of travel, depending on whether the cage is installed in the first orientation or the second orientation.

14. The regulator of claim 1, wherein the cage apertures include slots that extend between a first end of the cage and a second end of the cage.

15. The regulator of claim 14, wherein each slot of a plurality of the slots extend axially into a low flow portion of the cage, within which the peripheral sealing element is configured to sealingly contact the inner surface.

16. The regulator of claim 15, wherein the plurality of slots exhibit a plurality of different lengths of axial extension into the low flow portion of the cage.

17. A regulator comprising:
a regulator body defining an inlet and an outlet;
a seat disposed within the regulator body, along a flow path between the inlet and the outlet;
a plug moveable relative to the seat to regulate flow along the flow path, the plug defining a circumferential groove that retains a peripheral sealing element; and
an annular cage disposed between the inlet and the outlet, the annular cage defining a central opening that moveably receives the plug so that the peripheral sealing element and a radially inner surface of the annular cage collectively define a flow characterization for flow along the flow path past the seat, the flow characterization varying based on a position of the plug relative to the seat,
wherein the annular cage is configured to be selectively installed in the regulator body in either of a first orientation or a second orientation that is reversed relative to the first orientation; and
wherein the flow characterization varies differently, based on the position of the plug relative to the seat, depending on whether the annular cage is installed in the first orientation or the second orientation.

18. The regulator of claim 17, wherein, in at least one of the first orientation or the second orientation, the radially inner surface includes a first sealing portion adjacent a first end of the annular cage and a clearance portion disposed downstream of the sealing portion;
wherein the first sealing portion has a smaller diameter than the clearance portion and the annular cage defines a first transition portion between the sealing portion and the clearance portion; and
wherein, the peripheral sealing element is configured to be substantially clear of the clearance portion when axially aligned with the clearance portion; and
wherein, as the plug moves the peripheral sealing element axially along the first transition portion in a closing direction, the first transition portion increasingly compresses the peripheral sealing element radially inwardly toward the plug.

19. A trim assembly for a regulator, the trim assembly comprising:
a cage including a peripheral wall defining an opening and a plurality of cage apertures formed in the peripheral wall, the opening defining a radially inner surface including a sealing portion at a first end of the cage and having a first internal diameter, a clearance portion spaced from the sealing portion and having a second internal diameter larger than the first internal diameter, and a tapered transition portion extending between the sealing portion and the clearance portion, at least one of the plurality of cage apertures extending axially from the sealing portion to the clearance portion for flow through the peripheral wall of the cage; and
a plug including a sealing element, the plug being configured to be moveably received within the opening to move along a range of travel so that the sealing element contacts a radially inner surface of the cage to vary an effective flow area through the plurality of cage apertures based on the position of the plug along the range of travel.

20. The trim assembly of claim 19, wherein the plurality of cage apertures includes a first aperture that includes, along the sealing portion, a narrower portion relative to a circumferential direction and includes, along the clearance portion, a wider portion relative to the circumferential direction.

\* \* \* \* \*